(12) United States Patent
Keay

(10) Patent No.: US 6,728,741 B2
(45) Date of Patent: Apr. 27, 2004

(54) HARDWARE ASSIST FOR DATA BLOCK DIAGONAL MIRROR IMAGE TRANSFORMATION

(75) Inventor: John Keay, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 563 days.

(21) Appl. No.: 09/732,972

(22) Filed: Dec. 8, 2000

(65) Prior Publication Data
US 2002/0111977 A1 Aug. 15, 2002

(30) Foreign Application Priority Data
Feb. 4, 2000 (EP) .......................... 003000879

(51) Int. Cl.[7] .............................................. G06F 17/16
(52) U.S. Cl. ....................................................... 708/401
(58) Field of Search ......................................... 708/401

(56) References Cited

U.S. PATENT DOCUMENTS

| | | | |
|---|---|---|---|
| 4,918,527 A | * 4/1990 | Penard et al. | 348/718 |
| 5,644,517 A | 7/1997 | Ho | |
| 5,757,432 A | 5/1998 | Dulong et al. | |
| 5,805,476 A | 9/1998 | Kim et al. | |
| 6,021,420 A | * 2/2000 | Takamuki | 708/401 |
| 6,145,077 A | * 11/2000 | Sidwell et al. | 712/300 |
| 6,202,148 B1 | * 3/2001 | McCanny et al. | 713/1 |

FOREIGN PATENT DOCUMENTS

| | | |
|---|---|---|
| EP | 0 388 051 A | 9/1990 |
| EP | 0 293 700 A | 12/1998 |

* cited by examiner

Primary Examiner—David H. Malzahn
(74) Attorney, Agent, or Firm—Robert D. Marshall, Jr.; W. James Brady, III; Frederick J. Telecky, Jr.

(57) ABSTRACT

A data processing apparatus and method for quickly and efficiently producing a diagonally (170) mirrored image of a block of data (168). The apparatus comprises a first input operand (182) consisting of a first half of an N×N bit data block and a second input operand (184) consisting of a second half of an N×N bit data block. A first hardware bit transformation (188) forms an upper half of an N-way bit deal of the two operands (186), and a second hardware bit transformation (192) forms a lower half of the N-way bit deal (190). The upper and lower halves of the N-way bit deal represent a diagonally mirrored image (172) of the N×N bit data block. The method retrieves a data block from memory and packs it into two input operand registers. The two hardware bit transformations fill respective destination registers. The data is unpacked from the destination registers and stored to memory. Diagonally mirrored imaged of larger blocks of data can be formed using this technique on minor image blocks and swapping the mirrored minor image blocks.

18 Claims, 17 Drawing Sheets

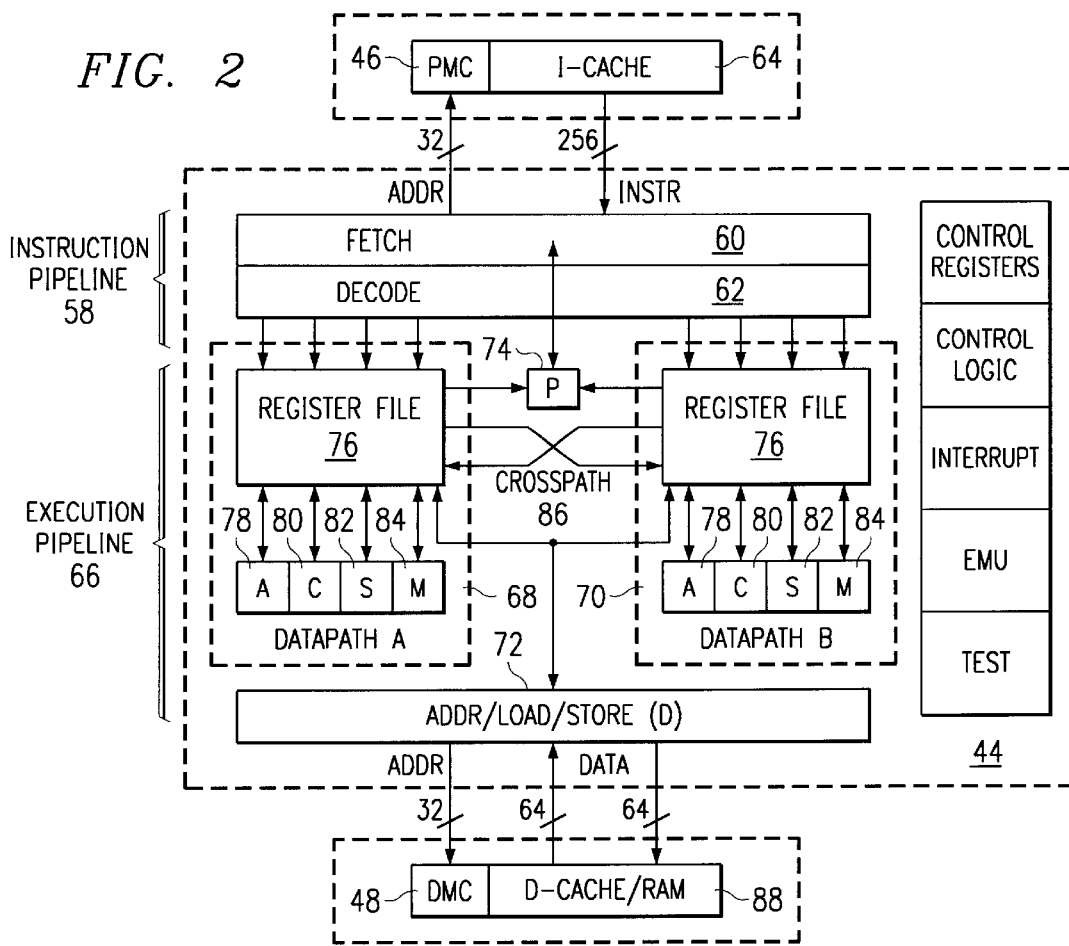

| UNIT GROUP | OPERATIONS | REGISTER FILE ACCESS | |
|---|---|---|---|
| | | PRIMARY DATAPATH | ALTERNATIVE DATAPATH |
| A | - GENERAL ARITHMETIC<br>- BOOLEAN AND CONTROL REGISTER ACCESS | R/W | R |
| C | - COMPARE, SHIFT, BOOLEAN<br>- ARITHMETIC: ADD, SUB | R/W | R |
| S | - SHIFT, ROTATE, EXTENDED BOOLEAN<br>- ARITHMETIC: ADD, SUB | R/W | R |
| M | - MULTIPLY<br>- ARTHMETIC: ADD, SUB | R/W | R |
| D | - LOAD<br>- STORE<br>- ADDRESS COMPUTATION | W TO BOTH<br>R FROM BOTH<br>R/W BOTH | |
| P | - BRANCH | R FROM BOTH | |

R=READ, W=WRITE

FIG. 3

| STAGE | FUNCTION |
|---|---|
| F0 | SEND PC TO PROGRAM MEMORY CONTROLLER. LDIP ASSIGNED. |
| F1 | CACHE BLOCK SELECT. |
| F2 | ADDRESS PHASE OF INSTRUCTION CACHE ACCESS. |
| F3 | DATA PHASE OF INSTRUCTION CACHE ACCESS. |
| F4 | FETCH PACKET SENT TO DSP. |

*FIG. 5a*

| STAGE | FUNCTION |
|---|---|
| D0 | DETERMINE VALID INSTRUCTIONS IN CURRENT FETCH PACKET. |
| D1 | SORTS INSTRUCTIONS IN EXECUTE PACKET ACCORDING TO DESTINATION UNITS. |
| D2 | INSTRUCTIONS SENT TO DESTINATION UNITS. CROSSPATH REGISTER READS OCCUR. |
| D3 | UNITS DECODE INSTRUCTIONS. REGISTER FILE READ (2ND PHASE). |

*FIG. 5b*

| UNIT | STAGE | FUNCTION |
|---|---|---|
| NON M UNIT | E | EXECUTION OF OPERATION BEGINS AND COMPLETES. FULL RESULT AVAILABLE AT END OF CYCLE. |
| M UNIT | M0 | EXECUTION OF MULTIPLY OPERATION BEGINS. (OR, NON-MULTIPLY OPERATION BEGINS AND COMPLETES.) |
| M UNIT | M1 | MULTIPLY OPERATION CONTINUES. (OR, NON-MULTIPLY RESULT WRITTEN TO REGISTER FILE (PHASE 1).) |
| M UNIT | M2 | MULTIPLY OPERATION COMPLETES. |

*FIG. 5c*

| STAGE | FUNCTION |
|---|---|
| E | ADDRESS GENERATION OCCURS. REGISTER FILE ACCESS FOR READ DATA. |
| L0 | LOAD ADDRESS GENERATED DURING E IS SENT TOWARDS THE DMC. |
| L1 | ADDRESS DECODE, TC ARBITRATION, TAG COMPARES. |
| L2 | ADDRESS DECODE, TC ARBITRATION, TAG COMPARES. |
| L3 | ADDRESS PHASE OF DATA CACHE ACCESS. |
| L4 | DATA PHASE OF DATA CACHE ACCESS. |
| L5 | 64-BIT DATA SENT TO DSP. |

*FIG. 5d*

| STAGE | FUNCTION |
|---|---|
| E | ADDRESS GENERATION OCCURS. REGISTER FILE ACCESS FOR WRITE DATA. |
| S0 | ADDRESS SENT TO DMC. |
| S1 | ADDRESS DECODE IN DMC. WRITE DATA ALIGNMENT. |
| S2 | TAG COMPARE IN DMC. WRITE DATA SENT TO DMC. |
| S3 | ADDRESS PHASE IN DATA CACHE. |
| S4 | DATA PHASE IN DATA CACHE. |

*FIG. 5e*

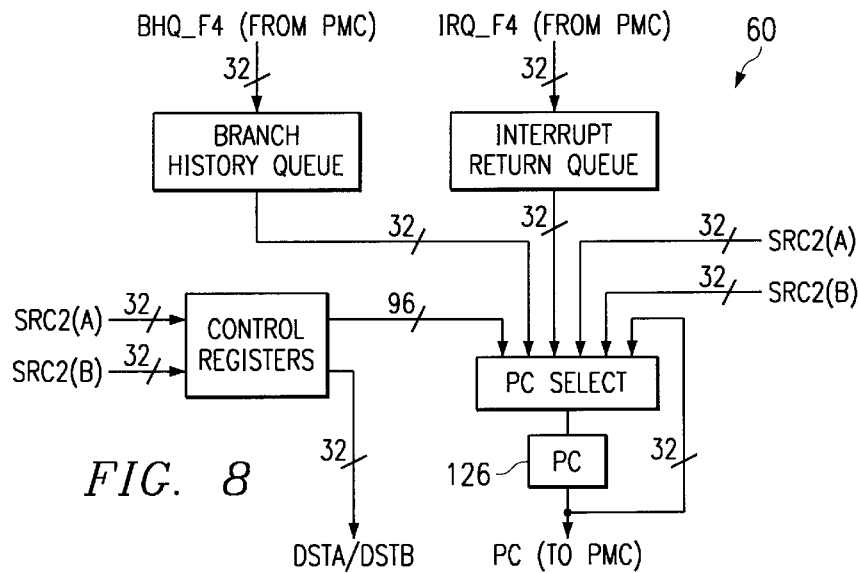

FIG. 8

| || [PREDICATION REG] INSTRUCTION_MNEMONIC .UNIT-DATAPATH-CROSSPATH OP1, OP2, DST ||||
|---|---|---|---|
| WHERE: ||||
|   || | =TO BE SCHEDULED IN PARALLEL WITH PRECEDING INSTRUCTION(S) |||
|   [PREDICATION REG] | =REGISTER CONTAINING PREDICATION VALUE |||
|   .UNIT | =A,C,S,M,D,P UNIT GROUPS |||
|   DATAPATH | =1 FOR DATAPATH A, 2 FOR DATAPATH B |||
|   CROSSPATH | =X IF ONE OPERAND COMES FROM OPPOSITE REGISTER FILE |||
|   OP1, OP2 | =SOURCE REGISTERS |||
|   DST | =DESTINATION REGISTER |||

| UNIT GROUP | ASSEMBLY NOTATIONS ||  ASSEMBLY EXAMPLES | WITH CROSSPATH |
|---|---|---|---|---|
| | DATAPATH A | DATAPATH B | | |
| A | .A1 | .A2 | ADD  .A1  A1,A2,A3<br>SUB  .A2  B1,B2,B3 | ADD  .A1X  A1,B2,A3<br>SUB  .A2X  B1,A2,B3 |
| C | .C1 | .C2 | CMPEQ  .C1  A1,A2,A3<br>CMPEQ  .C2  B1,B2,B3 | CMPEQ  .C1X  A1,B2,A3<br>CMPEQ  .C2X  B1,A2,B3 |
| S | .S1 | .S2 | SHL  .S1  A1,A2,A3<br>SHL  .S2  B1,B2,B3 | SHL  .S1X  A1,B2,A3<br>SHL  .S2X  B1,A2,B3 |
| M | .M1 | .M2 | MPY  .M1  A1,A2,A3<br>MPY  .M2  B1,B2,B3 | MPY  .M1X  A1,B2,A3<br>MPY  .M2X  B1,A2,B3 |
| D | .D || LDB  .D  *A8,A12<br>STB  .D  A8,*A12<br>ADDAH  .D  A8,A2,B1 | n/a |
| P | .P || B    A8 | n/a |

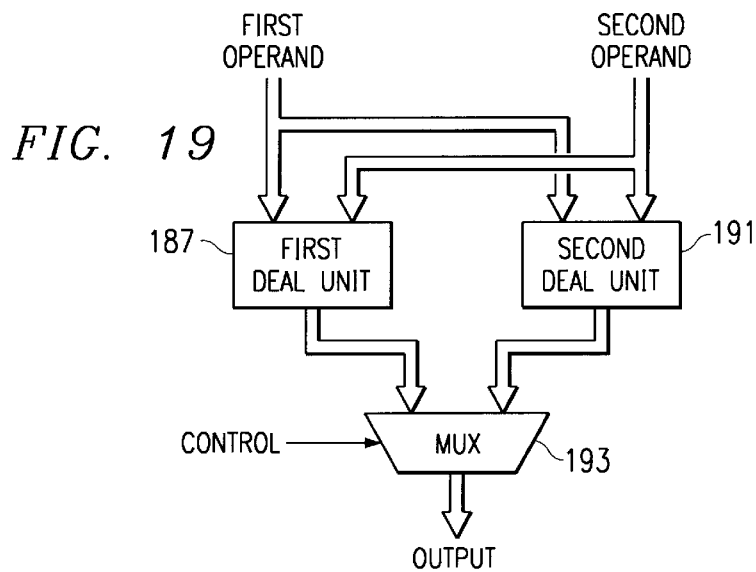
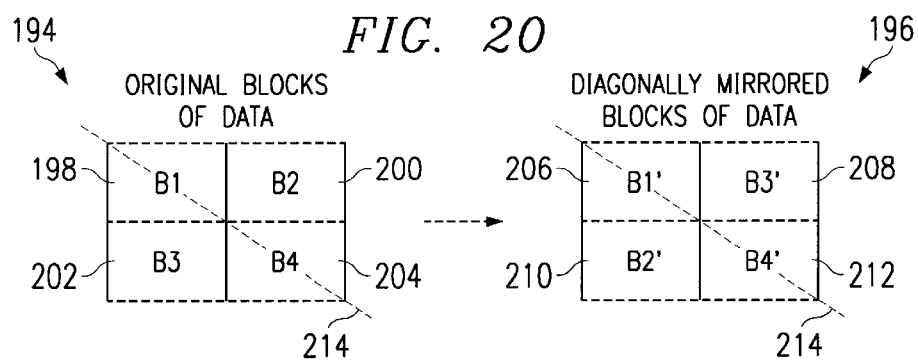
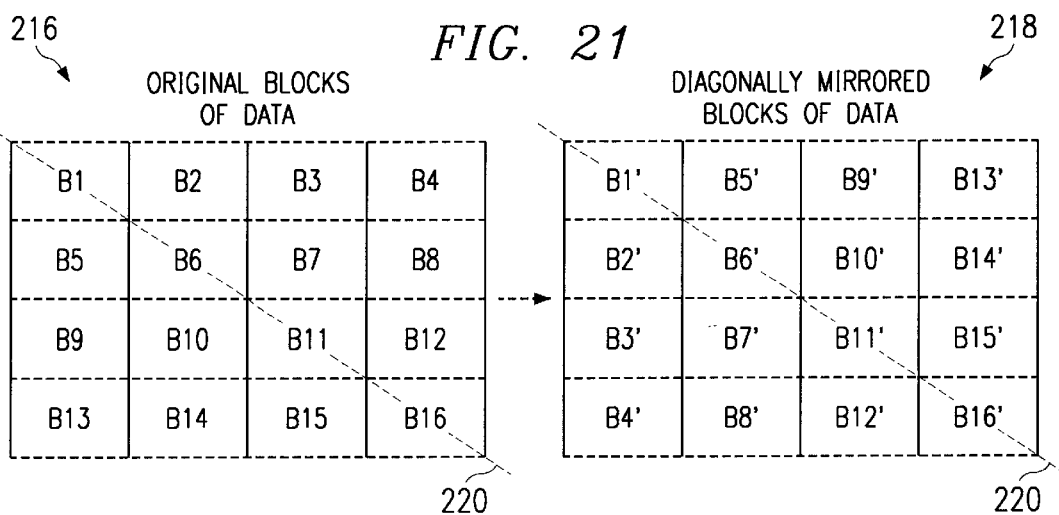

HARDWARE ASSIST FOR DATA BLOCK DIAGONAL MIRROR IMAGE TRANSFORMATION

FIELD OF THE INVENTION

This invention relates to data processing devices, electronic processing and control systems and methods of their manufacture and operation.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

In accordance with a preferred embodiment of the invention, there is disclosed a data processing apparatus which quickly and efficiently produces a diagonally mirrored image of an array or block of data. The apparatus comprises a first input operand consisting of a first half of an N×N bit data block and a second input operand consisting of a second half of an N×N bit data block. A first hardware bit transformation stores an upper half of an N-way bit deal of the first and second operands, and a second hardware bit transformation stores a lower half of the N-way bit deal. The upper and lower halves of the N-way bit deal represent a diagonally mirrored image of the N×N bit data block.

In a further embodiment, the first input operand is read from a first input register, the second input operand is read from a second input register, the upper half of the N-way bit deal is stored in a first destination register, and the lower half of the N-way bit deal is stored in a second destination register.

In accordance with another preferred embodiment of the invention, there is disclosed a method of generating a diagonally mirrored image of an N×N bit data block. The method comprises retrieving a first N/2 N-bit rows of the data block from a memory and packing the first N/2 rows into a first input operand loaded into a first input register, and retrieving a second N/2 N-bit rows of the data block from the memory and packing the second N/2 rows into a second input operand loaded into a second input register. A first hardware bit transformation is performed storing an upper half of an N-way bit deal of the first and second input operands to a first destination register. A second hardware bit transformation is also performed storing a lower half of an N-way bit deal of the first and second input operands to a second destination register. N N-bit data segments from the first and second destination registers are unpacked and the data segments are stored to the memory, whereby the N N-bit data segments represent the diagonally mirrored image of the N×N bit data block.

In accordance with another preferred embodiment of the invention, there is disclosed a method of generating a diagonally mirrored image of an M×M bit data block. The method comprises dividing the M×M bit data block into Y N×N bit data blocks, wherein M=N×Z, Z is an integer greater than one, and Y=Z2. The method further comprises generating minor diagonally mirrored images of each of the N×N bit data blocks. Each minor transformation comprises retrieving a first N/2 N-bit rows of the N×N data block from a memory and packing the first N/2 rows into a first input operand loaded into a first input register, retrieving a second N/2 N-bit rows of the N×N data block from the memory and packing the second N/2 rows into a second input operand loaded into a second input register, performing a first hardware bit transformation storing an upper half of an N-way bit deal of the first and second input operands to a first destination register, performing a second hardware bit transformation storing a lower half of an N-way bit deal of the first and second input operands to a second destination register, unpacking N N-bit data segments from the first and second destination registers, and storing the minor diagonally mirrored image to the memory, wherein N×N data block A and N×N data block B are swapped in memory if block A and block B are mirror image blocks of each other about a major diagonal of the M×M bit data block where a b for bit(a,b).

An advantage of the inventive concepts is that an operation which is cumbersome and slow to perform in software is significantly speeded up without adding excess complexity to the hardware design.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2 is a top-level block diagram of a DSP cluster from the microprocessor of FIG. 1;

FIG. 3 is a chart of the resource availability and register file access for the datapath unit groups in the DSP cluster of FIG. 2;

FIGS. 5a, 5b, 5c, 5d and 5e are charts illustrating the functions of each stage of the pipelines of FIG. 4;

FIG. 8 is a block diagram of the fetch unit of the DSP core of FIG. 2;

FIG. 15 is a chart of the basic assembly format for DSP core instructions;

FIG. 17 is a diagram of the data from FIG. 16 before and after the diagonal mirror image transformation;

FIG. 18a is a diagram of the first cycle of an 8-way bit deal transformation performed on two 32-bit words;

FIG. 18b is a diagram of the second cycle of an 8-way bit deal transformation performed on two 32-bit words;

FIG. 19 is a block diagram illustrating example hardware for performing the two 8-way bit deal transformations illustrated in FIGS. 18a and 18b;

FIG. 20 is a diagram illustrating a diagonal mirror image transformation performed on a 2-block by 2-block segment of data; and FIG. 21 is a diagram illustrating a diagonal mirror image transformation performed on a 4-block by 4-block segment of data.

DETAILED DESCRIPTION OF THE PREFERRED EMBODIMENTS

Figure 1:
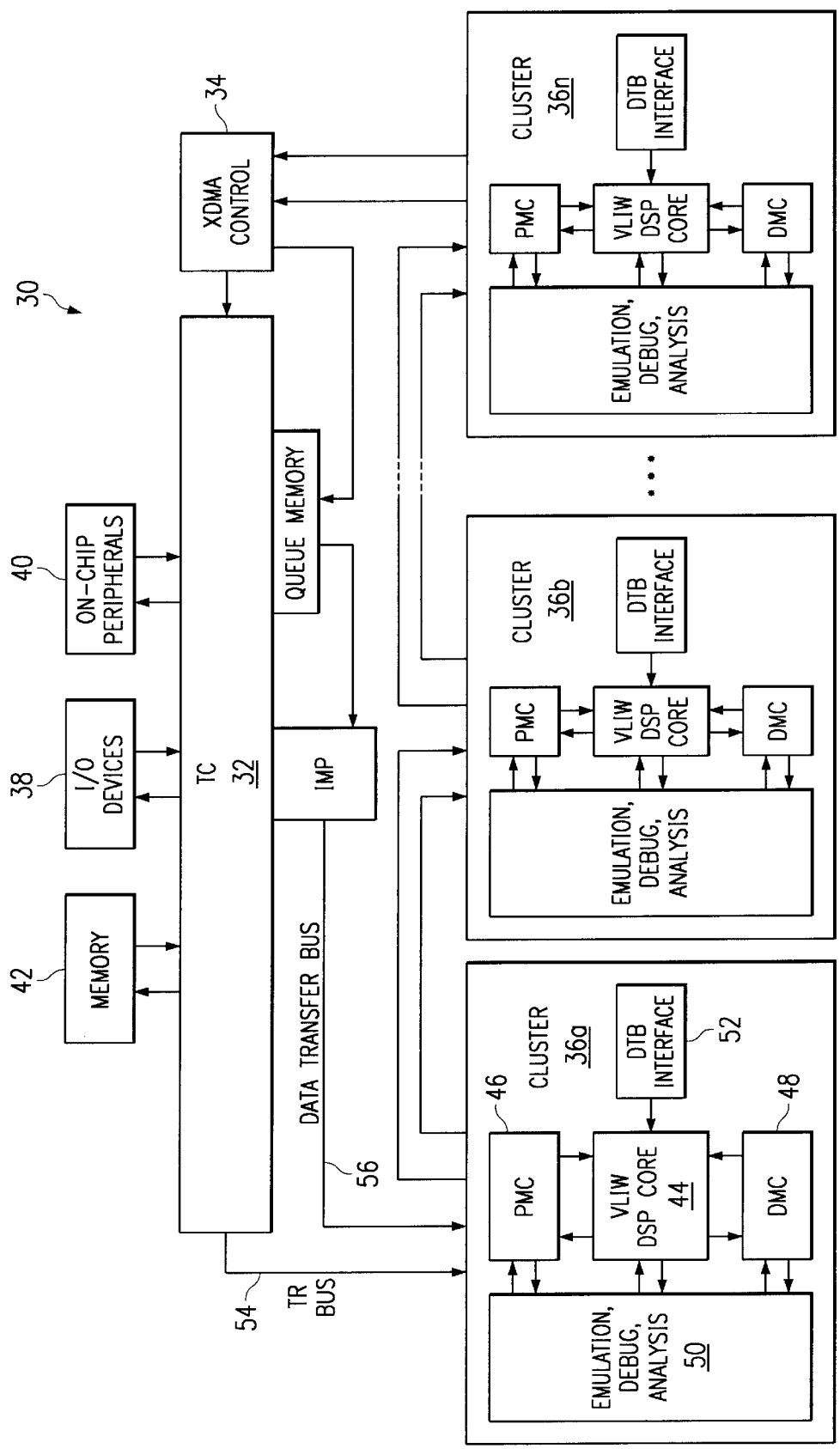
FIG. 1 is a top-level block diagram of a microprocessor.

According to a preferred embodiment of the present invention, a microprocessor architecture is provided including certain advantageous features. FIG. 1 is a high-level block diagram of an exemplary microprocessor in which a preferred embodiment of the invention is presented. In the interest of clarity, FIG. 1 shows only those portions of microprocessor 30 that may be relevant to an understanding of an embodiment of the present invention. Details of the general construction of microprocessors are well known, and may be found readily elsewhere. For example, U.S. Pat. No. 5,072,418 issued to Frederick Boutand, et al., describes a DSP in detail and is incorporated herein by reference. Details of portions of microprocessor 30 relevant to an embodiment of the present invention are explained in sufficient detail below so as to enable one of ordinary skill in the microprocessor art to make and use the invention.

Generally, microprocessor 30 comprises Transfer Controller (TC) 32, External Direct Memory Access (XDMA) Controller 34, and DSP clusters 36a–36n. Transfer Controller 32 provides for all data communication among DSP clusters 36a–36n, external input/output (I/O) devices 38, on-chip peripherals 40, and memory 42. While any given cluster such as DSP cluster 36a can access its own internal local memory within the cluster without permission from TC 32, any access to global memory outside of its local memory requires a TC directed data transfer, whether the access is to external memory or to another DSP cluster's own local memory. XDMA Controller 34 provides handling of externally initiated DMA requests while avoiding interrupting any DSP clusters 36a–36n. Each DSP cluster 36 comprises a very long instruction word (VLIW) DSP core 44, Program Memory Controller (PMC) 46, Data Memory Controller (DMC) 48, an emulation, analysis and debug block 50, and Data Transfer Bus (DTB) interface 52. DSP clusters 36 and TC 32 communicate over a pair of high throughput buses: Transfer Request (TR) bus 54, which is used to specify and request transactions in TC 32, and DTB 56, which is used to load and store data from objects in the global memory map. The overall architecture is scaleable, allowing for the implementation of up to 255 DSP clusters 36, although three DSP clusters 36 is currently the preferred embodiment. It should be noted that architectural details, such as the number of DSP clusters 36, and instruction set details are not essential to the invention. The microprocessor architecture outlined in FIG. 1 is exemplary only, and the invention is applicable to many microprocessor architectures.

FIG. 2 is a high-level block diagram illustrating more detail of DSP core 44. DSP core 44 is a 32-bit eight-way VLIW pipelined processor. The instruction set consists of fixed length 32-bit reduced instruction set computer (RISC) type instructions that are tuned for DSP applications. Almost all instructions perform register-to-register operations, and all memory accesses are performed using explicit load/store instructions. As shown in FIG. 2, instruction pipeline 58 consists of fetch stage 60 and decode stage 62. Fetch stage 60 retrieves program codes into the processor core from instruction cache 64 in groups of eight instructions called a fetch packet. Decode stage 62 parses the fetch packet, determines parallelism and resource availability, and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group, D-unit group 72, and a common branch unit group, P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66, of which eight may scheduled concurrently every cycle. Each functional unit group contains plural functional units, some of which are duplicated between unit groups. In total there are nine 32-bit adders, four 32-bit shifters, three Boolean operators, and two 32×16 multipliers. The multipliers are each configurable into two 16×16 or four 8×8 multipliers.

FIG. 3 is a chart summarizing the resource availability and register accessibility for all of the functional unit groups in execution pipeline 66. Upon receiving control signals from decode stage 62, source operands are read from register file(s) 76 and sent to the execution unit groups. A summary of the types of operations performed by each unit group are listed in the Operations column in FIG. 3. The unit groups' access to the two register files in DSP core 44 is summarized in the Register File Access column in FIG. 3. Each datapath-specific unit group has direct read-access to its own register file (primary datapath), and may also read the other register file (alternative datapath) via read-only crosspath 86, shown in FIG. 2. The execution unit groups then carry out the operations and write back the results into their respective register file. There is no write access to the other datapath's register file for the datapath-specific unit groups. D-unit group 72 performs address computation, and has read/write access to both register files 76 and interfaces with data cache/random access memory (RAM) 88 via a 32-bit address bus and 64-bit data bus. P-unit group 74 handles branching and other program control flow, and has read access to both register files 76.

Figure 4:
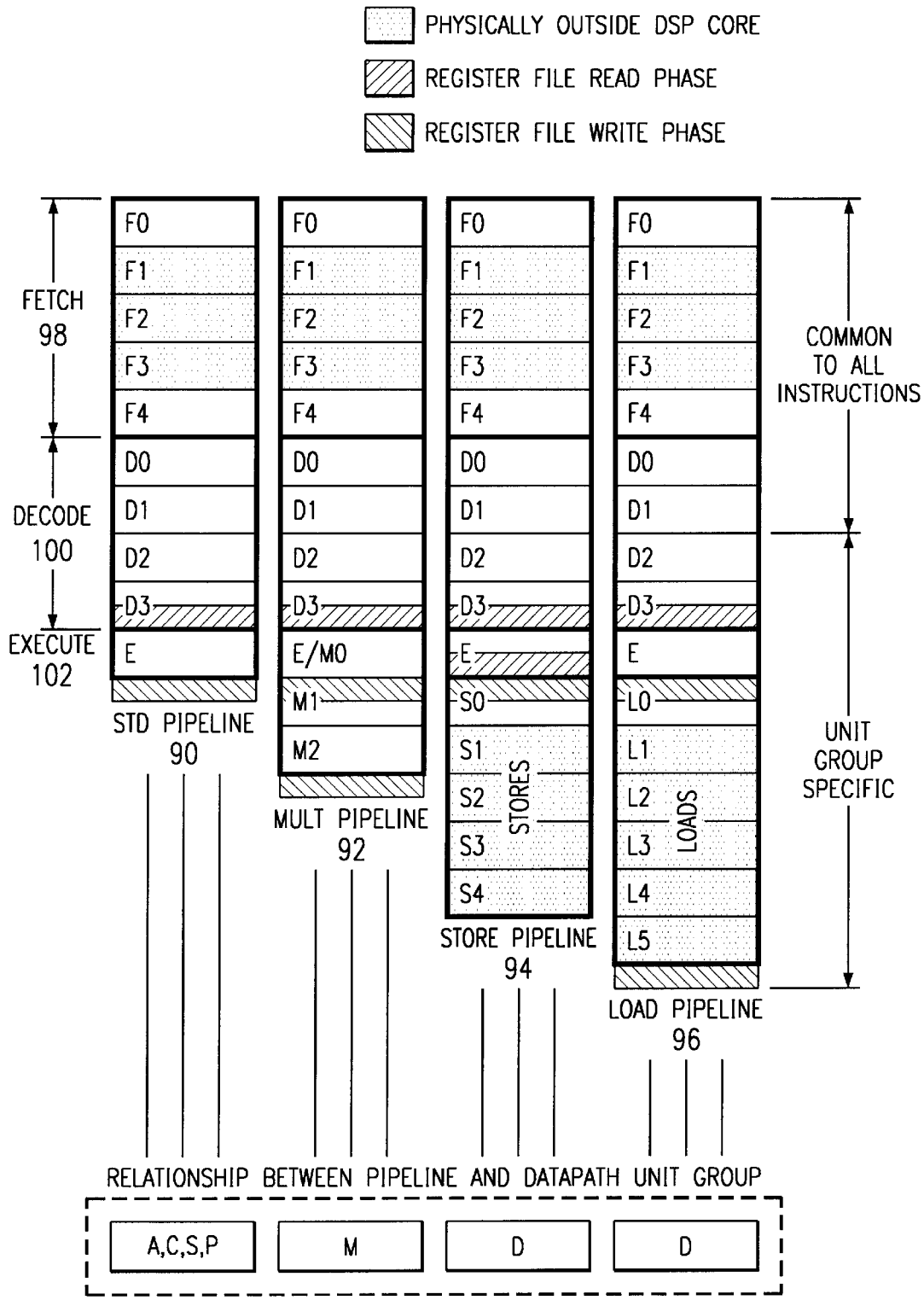
FIG. 4 is a chart of the DSP pipeline depth of the DSP core within the DSP cluster of FIG. 2.

DSP core 44 of FIG. 2 comprises a deep pipeline with minimal hardware logic control, thus facilitating high clock speeds and high data throughput, and providing a high degree of instruction execution control at the programming level. The DSP hardware does not manage data dependencies (e.g., read-before-write, write collision, etc.), therefore it is the compiler's or assembler's responsibility to take delay-slot requirements into account in instruction scheduling. FIG. 4 illustrates the four pipeline types utilized by DSP core 44: standard pipeline 90, used by the A-, C-, S-, and P-unit groups; multiply pipeline 92, used by the M-unit group; store pipeline 94, used by the D-unit group; and load pipeline 96, also used by the D-unit group. The pipeline depth varies from 10 stages for standard pipeline 90, to 13 stages for multiply pipeline 92, to 15 stages for store pipeline 94, and up to 16 stages for load pipeline 96. An operation advancing down the pipeline advances one stage every CPU cycle, which refers to the period during which an execute packet occupies any given execute stage. A CPU cycle equates to a clock cycle when there are no stalls. Conceptually, the DSP pipeline may be partitioned into two main pipelines, the instruction pipeline and the execution pipeline. The instruction pipeline is common to all instructions and includes the 5-stage instruction fetch function 98, and the 4-stage decode/dispatch function 100. The depth and functionality of execution pipeline 102 is instruction dependent. For example, non-multiply operations performed in the M-unit group do not require the deep pipeline necessary for multiply operations, so the results of these operations are available for write-back in stage M1. Similarly, the results of address math operations performed in the D-unit group are written to the register file at the end of stage E. Thus, even though these example instructions are performed by the M- and D-unit groups, respectively, their pipelines appear to be that of the standard pipeline.

Charts outlining the functions of each pipeline stage are shown in FIGS. 5a–5e. Fetch stages F0–F4 are listed in FIG. 5a. Most fetch stages occur outside the DSP core itself. Stage F0 initiates the fetch cycle by sending the program counter (PC) value to PMC 46. Stages F1, F2 and F3 occur outside DSP core 44 in PMC 46, with the new fetch packet being received by DSP core 44 at the end of stage F4. FIG. 5b lists decode stages D0–D3. Stages D0 and D1 are common to all execution unit groups and operate on every instruction executed by DSP core 44. Stage D0 determines the validity of instructions in the current fetch packet and determines the next fetch packet. Stage D1 sorts the current execution packet instructions by unit group. The current execution packet is then sent to the destination pipeline/unit group during stage D2. In stage D3, units decode received instructions, unit level control signals are generated, and register file access is performed.

The P-unit group is not datapath specific, but the branching pipeline operates like the A-, C-, and S-unit groups in that it has a single execution stage, with data being written to the program counter in the same write phase as the standard pipeline. The program counter is updated at the end of stage E, implying that the next CPU cycle will be stage F0 for the new address. This means that from the point a branch instruction is in stage E, there are ten CPU cycles until execution begins with instructions from the new address.

FIG. 5c lists execution stages E and M0–M2. Execution for non-multiply operations is performed in a single execute cycle, E. These include non-multiply arithmetics, Boolean operations, shifts, packs/unpacks, and address calculations. An extended execution pipeline, stages M0–M2, is provided for multiply operations due to their complexity. Functionally, stage M0 corresponds to stage E. Stages M1–M2 are required by the time necessary to perform a worst case 32 bit×16 bit multiply. The increased latency forces three delay slots on multiply operations. M-unit group 84 performs all multiply operations. Additionally, M-unit group 84 performs a few non-multiply instructions, which complete in stage M0.

FIG. 5d lists load stages L0–L5, and FIG. 5e lists store stages S0–S4. D-unit group 72 which performs these operations is not datapath specific, so datapaths A 68 and B 70 share a single load/store interface between them. Load/store operations are up to 64 bits wide and may reference the register file of either datapath. Address calculations for load/store operations complete in stage E. The generated address is then sent to DMC 48 in stage L0/S0. The load and store stages begin to differ at this point. For data loads, address decode takes two stages, L1 and L2. Address and data phases of data cache access occur in stages L3 and L4, and then read data is sent to DSP core 44 in stage L5 to complete the load. For data stores, address decode takes one stage, S1. Write data is sent to DMC 48 in stage S2, and then address and data phases of data cache access occur in stages S3 and S4 to complete the store.

Figure 6A:
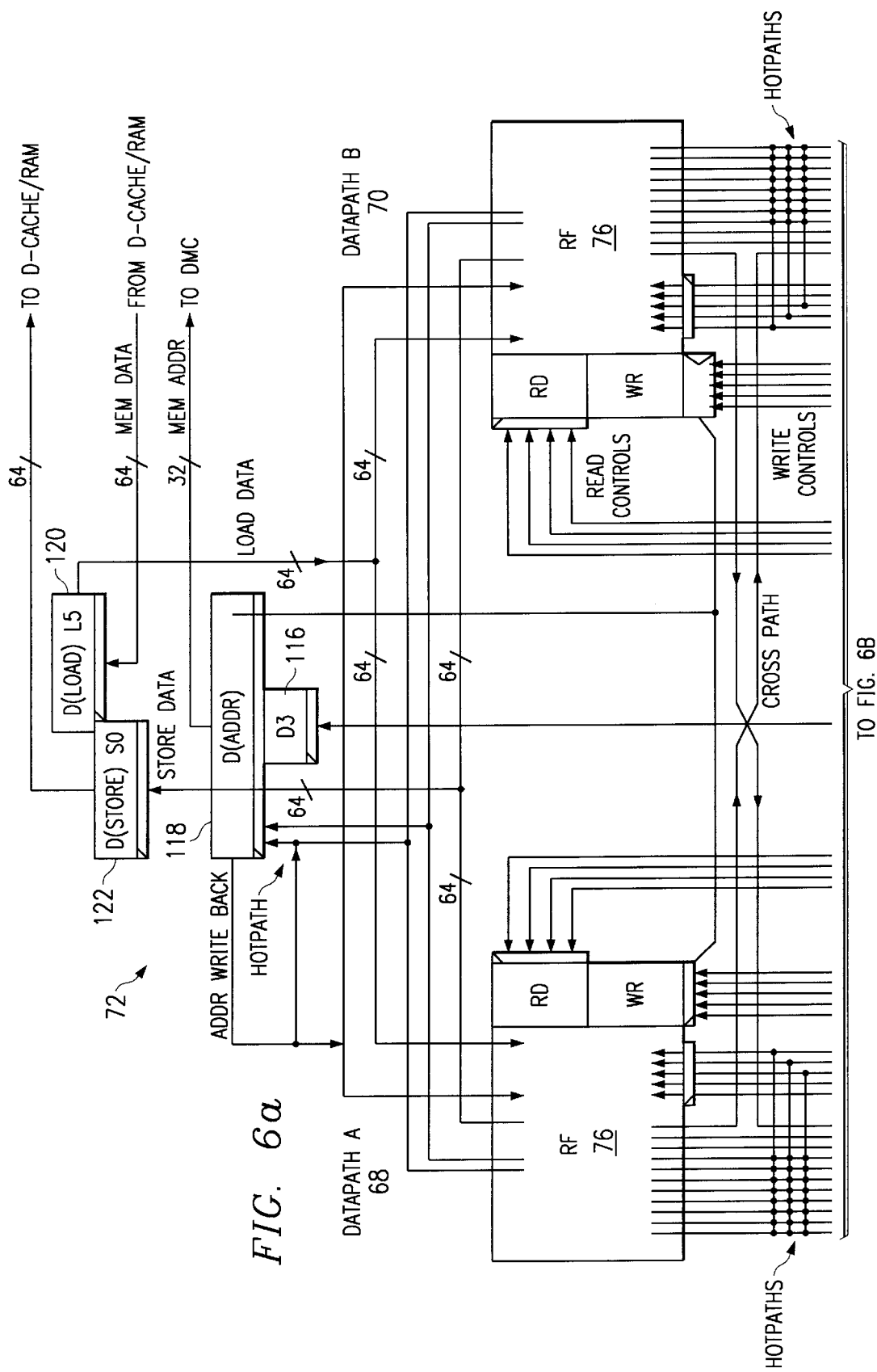
FIGS. 6a and 6b are a block diagram of the top-level buses of the pipeline of the DSP core of FIG. 2.
Figure 6B:
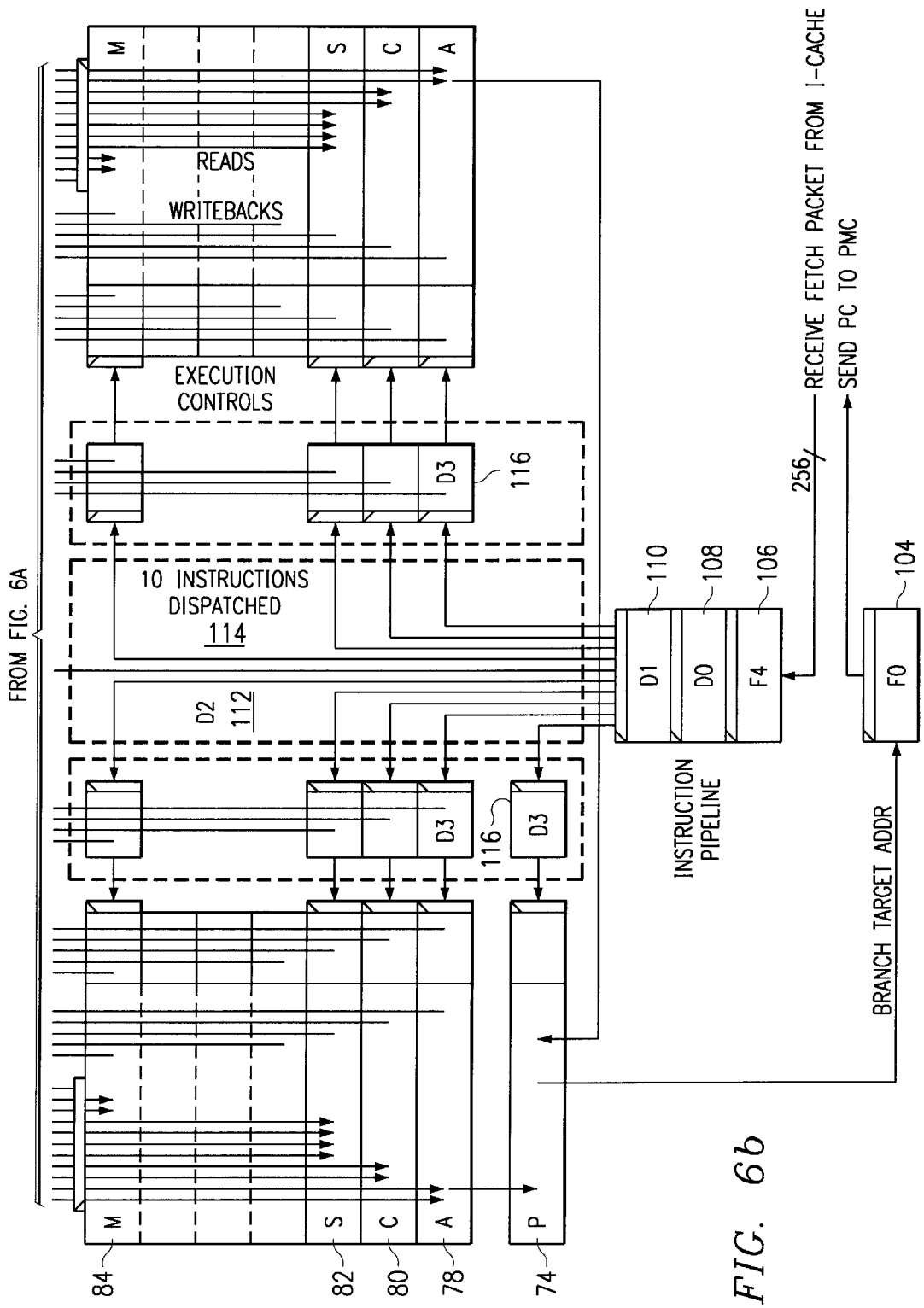
Figure 7:
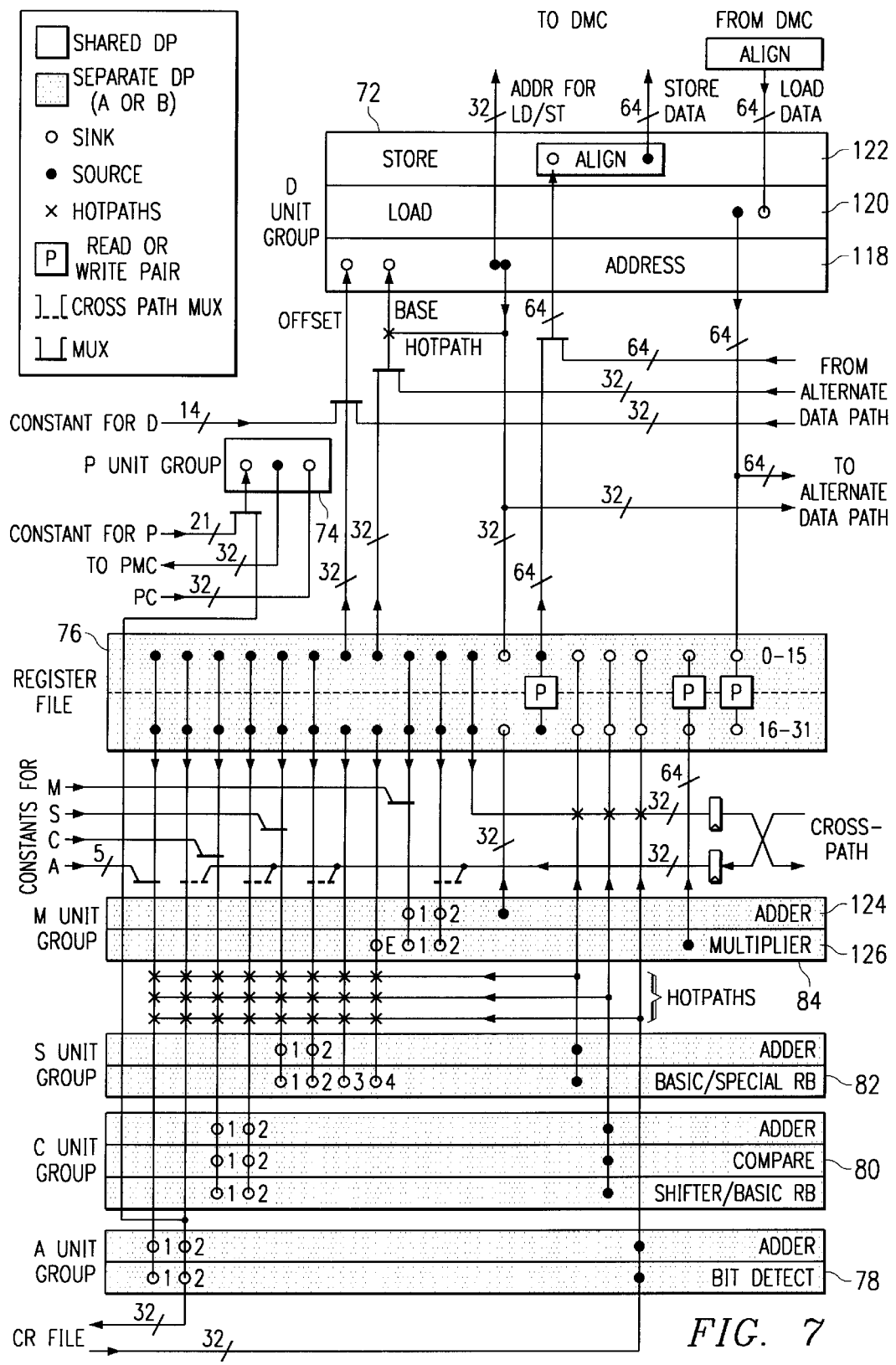
FIG. 7 is a block diagram of the datapath in the execution pipeline of the DSP core of FIG. 2.

FIGS. 6a, 6b and 7 illustrate the functionality of the instruction and execution pipelines in more detail. FIGS. 6a and 6b are the two halves of a block diagram of the top-level buses of the DSP core pipeline. The instruction pipeline, serving as the front end of DSP core 44, fetches instructions into the processor from PMC 46 and feeds the execution engines. Stage F0 104 resides in DSP core 44, and contains the program counter and branching control. Stages F1, F2 and F3 (not shown) reside in PMC 46, where memory addresses are decoded and cache accesses are performed. Stage F4 106 is reserved solely for the transport of the 256-bit fetch packet from PMC 46 to the DSP core 44. Stages D0 108 and D1 110 are used to parse the fetch packet and to assign individual 32-bit instructions to appropriate execute unit groups. Stage D2 112 is reserved solely for the transport of these instructions to the execute unit groups. There are physically 10 instruction buses 114 sent to stage D3 116, which are distributed locally to the execute unit groups: one bus to each A-78, C-80, S-82, and M-unit group 84, in each datapath 68 and 70, one bus to P-unit group 74, and one bus to D-unit group 72. Only a maximum of 8 instructions, however, may be dispatched to the execute pipeline in a given cycle. Stage D3 116 houses the final decoders which translate instruction opcodes into specific control signals to drive the respective execute unit groups. Stage D3 116 is also where register file 76 is accessed for operands.

Continuing from stage D3 116, the execute pipeline splits off into the two main datapaths, A 68 and B 70, each containing four execute unit groups, A 78, C 80, S 82, M 84, and register file 76. A unit group 78, C unit group 80, and S unit group 82 are 32-bit datapath hardware that perform single-cycle general arithmetic, shifting, logical and Boolean operations. M unit group 84 contains 2 functional units: a single-cycle 32-bit adder and a three-stage 64-bit multiplier. The execute pipeline also contains D unit group 72 and P unit group 74, each of which serves both datapaths.

D-unit group 72 has 3 functional units: single-cycle 32-bit address generator 118, 64-bit load unit 120 and 64-bit store unit 122. Address generator 118 functions in the pipeline as an execute unit similar to the A, C and S unit groups. Load unit 120 has 6 pipeline stages. Memory addresses computed by address generator 118 and load commands are formatted by load unit 120 and sent to DMC 48 in stage L0. DMC 48 uses stages L1, L2, L3 and L4 to decode memory addresses and perform cache access. Data alignment and zero/sign extension are done in stage L4. Stage L5 is reserved solely for data transport back to DSP core 44. Store unit 122 has 5 pipeline stages. Similar to load unit 120 operation, addresses and store commands are sent to DMC 48 in stage S0. The data to be stored is read out from register file 76 one cycle earlier in stage E, at the same time the address is being generated. The store data is also sent to DMC 48 in the same cycle as addresses and commands in stage S0. DMC 48 uses stages S1, S2, S3 and S4 for address decode and cache access for storing data.

P-unit group 74 performs branch computation and is a special case. With respect to timing, P-unit group 74 resides in the execute pipeline just like the single cycle units A 78, C 80 and S 82. However, since the program counter and control registers are located within the fetch unit in stage F0 104, P-unit group 74 resides physically with the fetch unit.

FIG. 7 is a detailed block diagram of the execute pipeline datapath. For clarity, the structure and interconnection between shared D-unit group 72 and shared P-unit group 74 and only one of the two separate main datapaths (A-unit group 78, C-unit group 80, S-unit group 82, M-unit group 84) are described. As instructions arrive at stage D3 of the instruction pipeline, decode logic peels off source and destination register addresses for each of the execute unit groups and sends them to RF 76 to fetch operands. In case of instructions with cross-file operands, RF access is performed a cycle earlier in stage D2, and stage D3 is used for cross-file transport. In stage D3, the instruction opcode is also decoded into control signals. At the end of stage D3, operand data and control signals are set-up to be sent to the respective execute unit groups.

Register file 76 is constructed of 2 banks of sixteen 32-bit registers each. There are 12 read ports and 6 write ports. In order to supply the many execute resources in the datapath while conserving read/write ports, the two read ports for base and offset of D-unit group 72 are shared with source 3 and 4 of S-unit group 82. In other words, the lower 16 registers (0–15) only go to D-unit group 72, and the upper 16 registers (16–31) only go to S-unit group 82. Similarly, the write port for the address result from D-unit group 72 is shared with the adder result from M-unit group 84. The lower 16 registers only go to D-unit group 72 and the upper 16 registers only go to M-unit group 84.

There are 3 classes of operation in the execute stages: single-cycle, 3-cycle, and load/store multi-cycle. All operations in A unit group 78, C unit group 80, and S unit group 82, the add functional unit in M-unit group 82, and address generation in D-unit group 72 are single cycle. Multiply functions in M unit group 84 take 3 cycles. Load and store operations take 6 and 5 cycles, respectively, in case of cache hit. Cycle counts are longer and variable in case of cache miss, because off-chip memory latency depends on the system configuration.

A unit group 78 and C unit group 80 each have two operand ports, source 1 and 2, while S unit group 82 has 4 operand ports, source 1, 2, 3, 4. Normal operations in S unit group 82 only uses 2 ports, while other operations such as Extended Rotate Boolean (ERB) use all 4 ports. If a condition requiring forwarding of a result from preceding instruction is detected, the forwarded result is selected, otherwise the RF operand is selected. Then the execute hardware (e.g. adder, shifter, logical, Boolean) performs the instructed operation and latches the result at the end of the E stage. The result from any one of the A, C, or S unit groups can be forwarded to the operand port of any of the A, C, or S unit groups within the same datapath. Address generator 118 in D unit group 72 operates similarly to the A, C, and S unit groups, except that D unit group's address result is only hotpathed back to itself. Adder 124 in M unit group 84 is similar, except that it has no hotpath. M unit group 84 has 3 operand ports. Normal multiplication uses 2 sources, while the extended port, which is shared with source 4 of S unit group 82, is used for Extended Multiply (EMPY) instructions. Multiplier 126 in M unit group 84 has 3 pipeline stages and no hotpath. The first 2 stages perform array multiplication in a carry/sum format. The last stage performs carry propagate addition and produces up to a 64-bit result. The 64-bit result is written back to RF 76 in pairs. Galois multiply hardware resides in M-unit group 84 alongside the main multiplier array, and it also takes 3 cycles. P unit group 74 operates just like the A, C, and S unit groups, except that it has no hotpath and that its result is consumed by the program control logic in the fetch unit instead of being written back to RF 76. P unit group 74 only has one operand port which is shared with source 2 of A unit group 78, which precludes parallel execution of a branch instruction and any instruction in A unit group 78.

FIGS. 8–14 are block diagrams illustrating more detail of the operation and hardware configuration of each of the unit groups within the DSP core. FIG. 8 is a top level diagram of fetch unit 60, which consists primarily of Program Counter 126 and other components generally responsible for controlling program flow, and the majority of control registers not directly related to the operation of a specific unit. With respect to program flow, fetch unit 60 has two main modes of operation: normal (sequential) operation and branch operation. Additionally, fetch unit 60 must initiate any interrupt/exception handling, resets, and privilege-level changes for DSP core 44.

Figure 9:
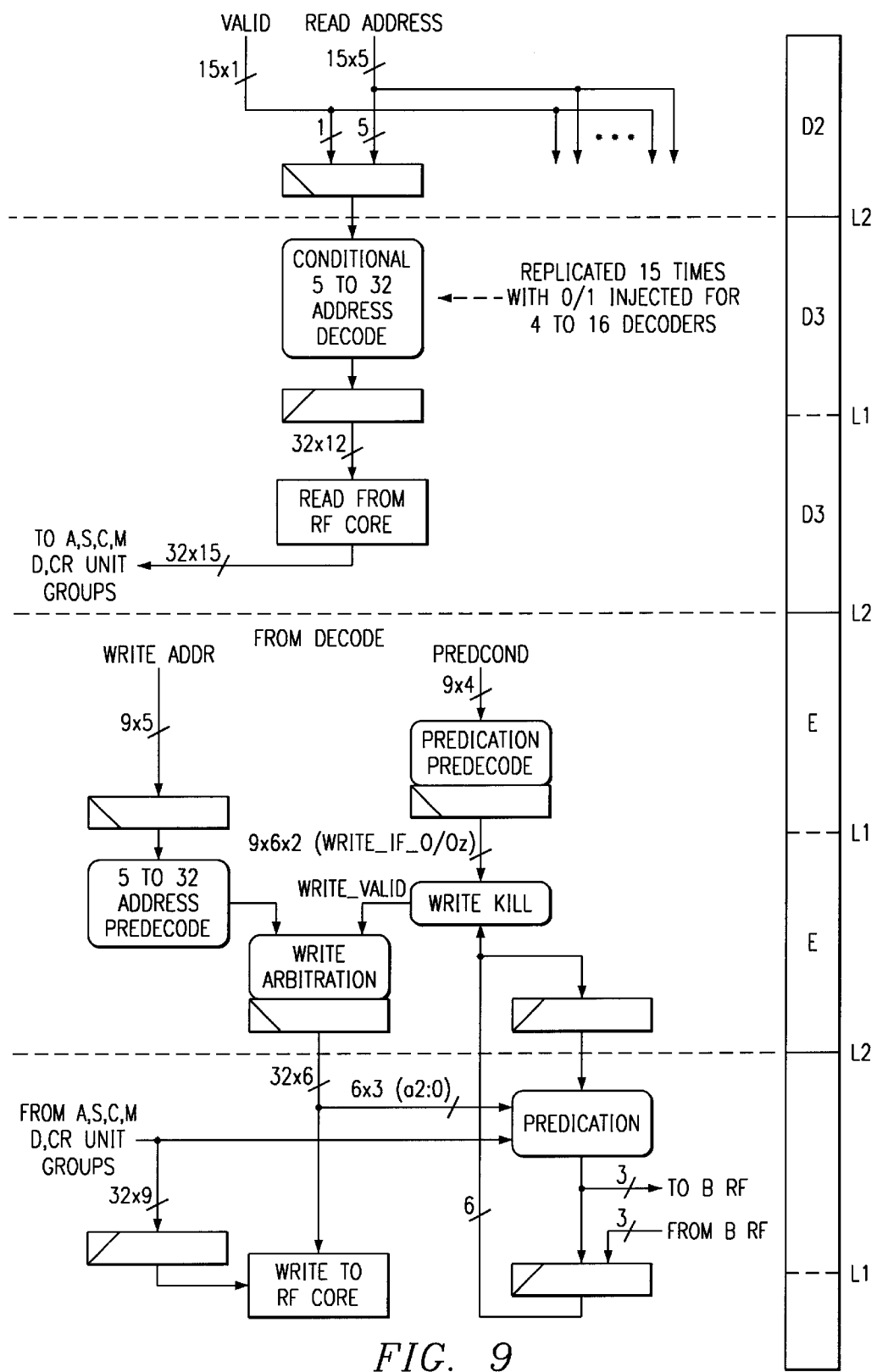
FIG. 9 is a block diagram of a register file of the DSP core of FIG. 2.

FIG. 9 is a top-level temporal block diagram of Register File 76. Within each DSP core 44 there are two datapaths, A 68 and B 70, each containing an identical register file. As used herein, the registers in the A (B) datapath are denoted by a0, . . . , a31 (b0, . . . , b31). Each register file 76 is composed of thirty-two 32-bit registers configured in upper and lower banks of 16 registers each. There are 12 read ports and 6 write ports for each register file 76.

Figure 10:
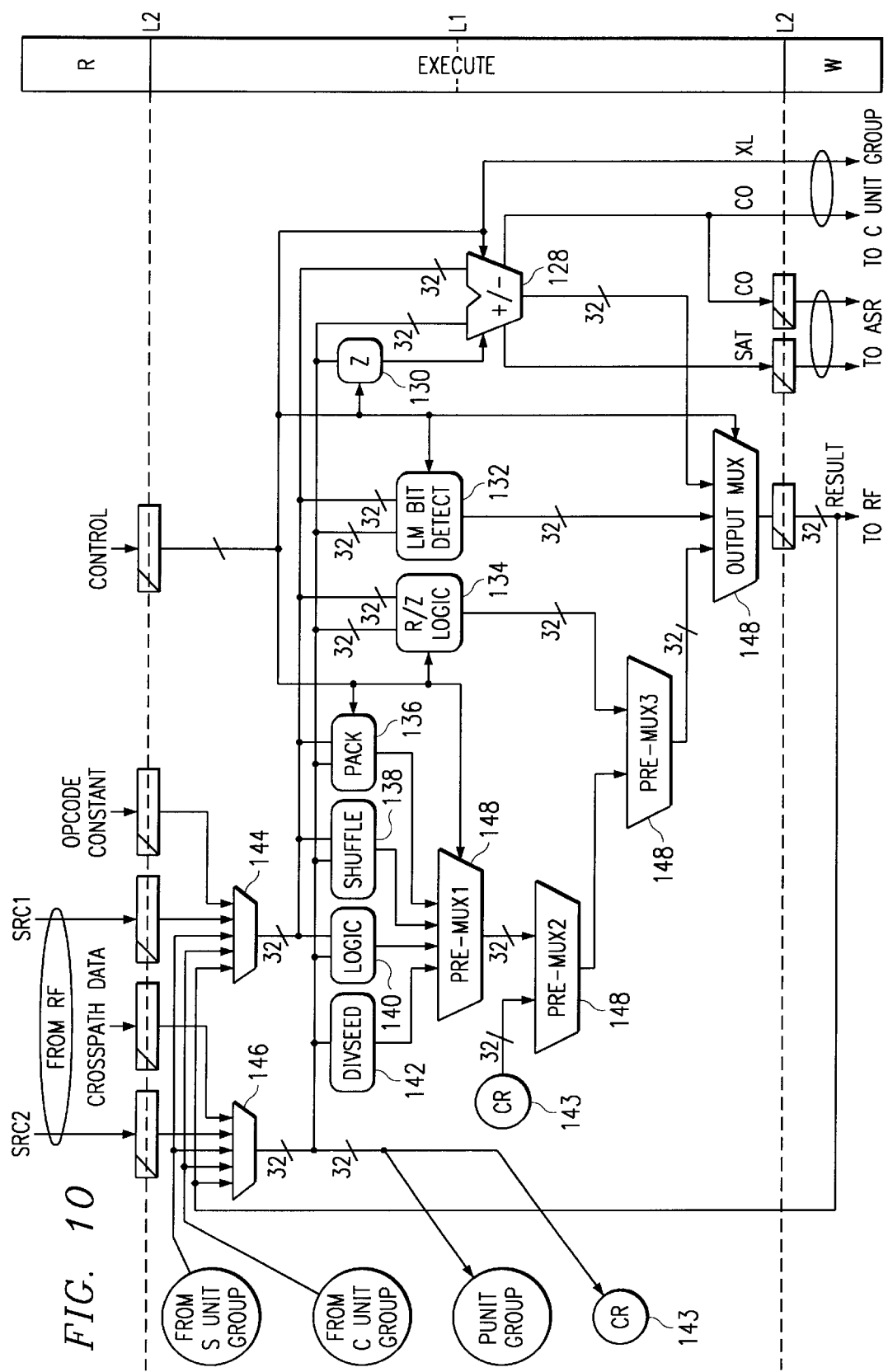
FIG. 10 is a block diagram of an A execution unit group of the DSP core of FIG. 2.

FIG. 10 is a top level block diagram of A unit group 78, which supports a portion of the arithmetic and logic operations of DSP core 44. A unit group 78 handles a variety of operation types requiring a number of functional units including A adder unit 128, A zero detect unit 130, A bit detection unit 132, A R/Z logic unit 134, A pack/replicate unit 136, A shuffle unit 138, A generic logic block unit 140, and A div-seed unit 142. Partitioning of the functional sub-units is based on the functional requirements of A unit group 78, emphasizing maximum performance while still achieving low power goals. There are two input muxes 144 and 146 for the input operands, both of which allow routing of operands from one of five sources. Both muxes have three hotpath sources from the A, C and S result busses, and a direct input from register file 76 in the primary datapath. In addition, src1 mux 144 can pass constant data from decode unit 62, while src2 mux 146 provides a path for operands from the opposite datapath. Result mux 148 is split into four levels. Simple operations which complete early in the clock cycle are pre-muxed in order to reduce loading on the critical final output mux. A unit group 78 is also responsible for handling control register operations 143. Although no hardware is required, these operations borrow the read and write ports of A unit group 78 for routing data. The src2 read port is used to route data from register file 76 to valid configuration registers. Similarly, the write port is borrowed to route configuration register data to register file 76.

Figure 11:
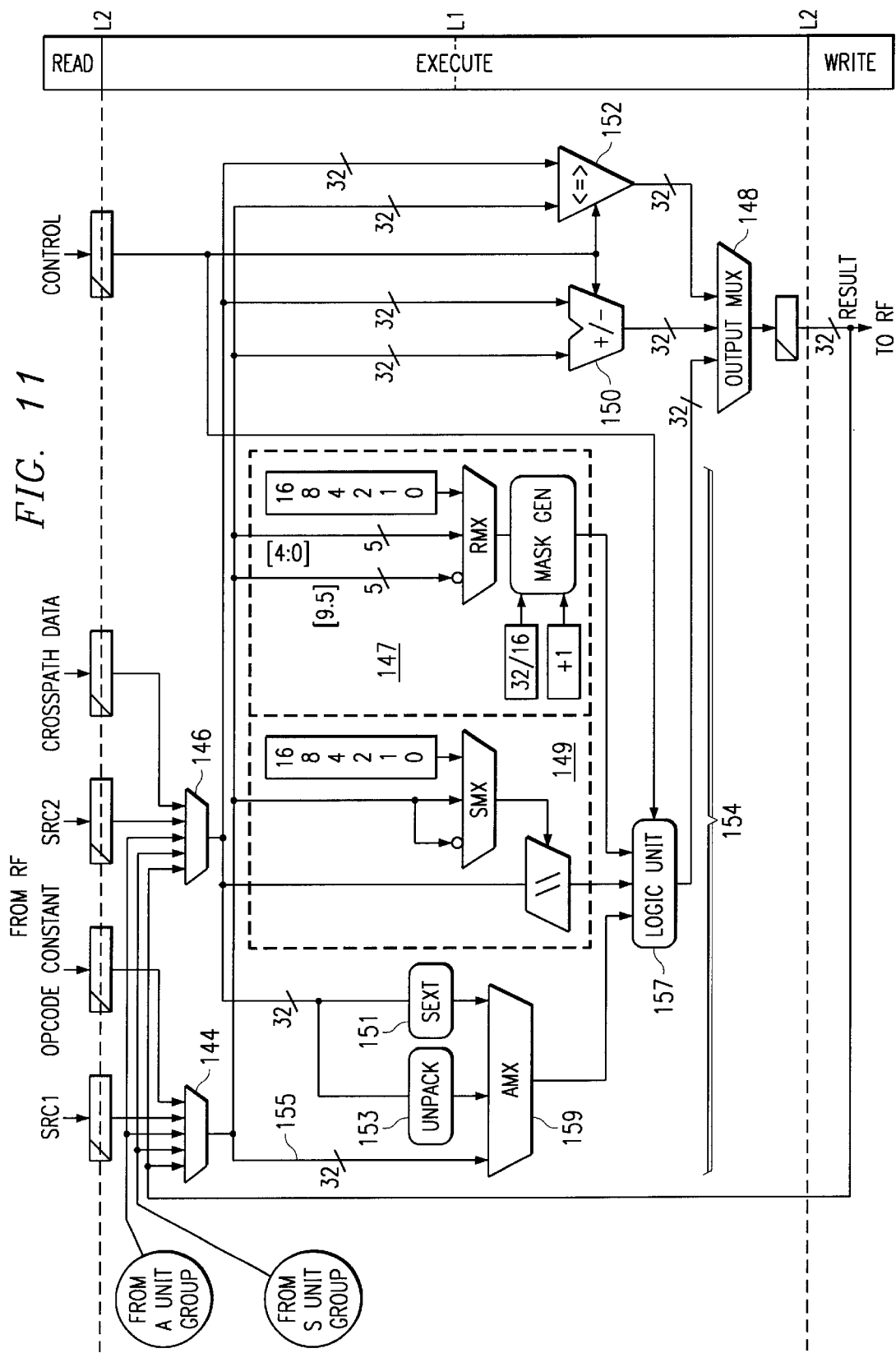
FIG. 11 is a block diagram of a C execution unit group of the DSP core of FIG. 2.

FIG. 11 is a top level block diagram of C unit group 80, which executes a subset of the arithmetic and logical operations of DSP core 44. Src1 input mux 144 and src2 input mux 146 perform the same functions as the input muxes in A unit group 78. C unit group 80 has three major functional units: C adder unit 150, C comparator unit 152 and C rotate/Boolean unit 154. C rotate/Boolean functional unit 154 includes C mask generator unit 147, C shifter unit 149, C sign-extension unit 151, C unpack unit 153, C move unit 155 and C logical unit 157. Like A unit group 78, the functional units of S unit group 80 are efficiently partitioned to achieve maximum performance while minimizing the power and area requirements. C Amx mux 159 selects an output from sign-extension unit 151, C unpack unit 153 or C move unit 155 for forwarding to C logical unit 157. Outputs from C mask generator unit 147 and C shifter unit 149 are also forwarded to C logical unit 157. Finally, result mux 148 selects an output from one of the three major functional units, C adder unit 150, C comparator unit 152 and C rotate/Boolean unit 154, for forwarding to register file 76.

Figure 12:
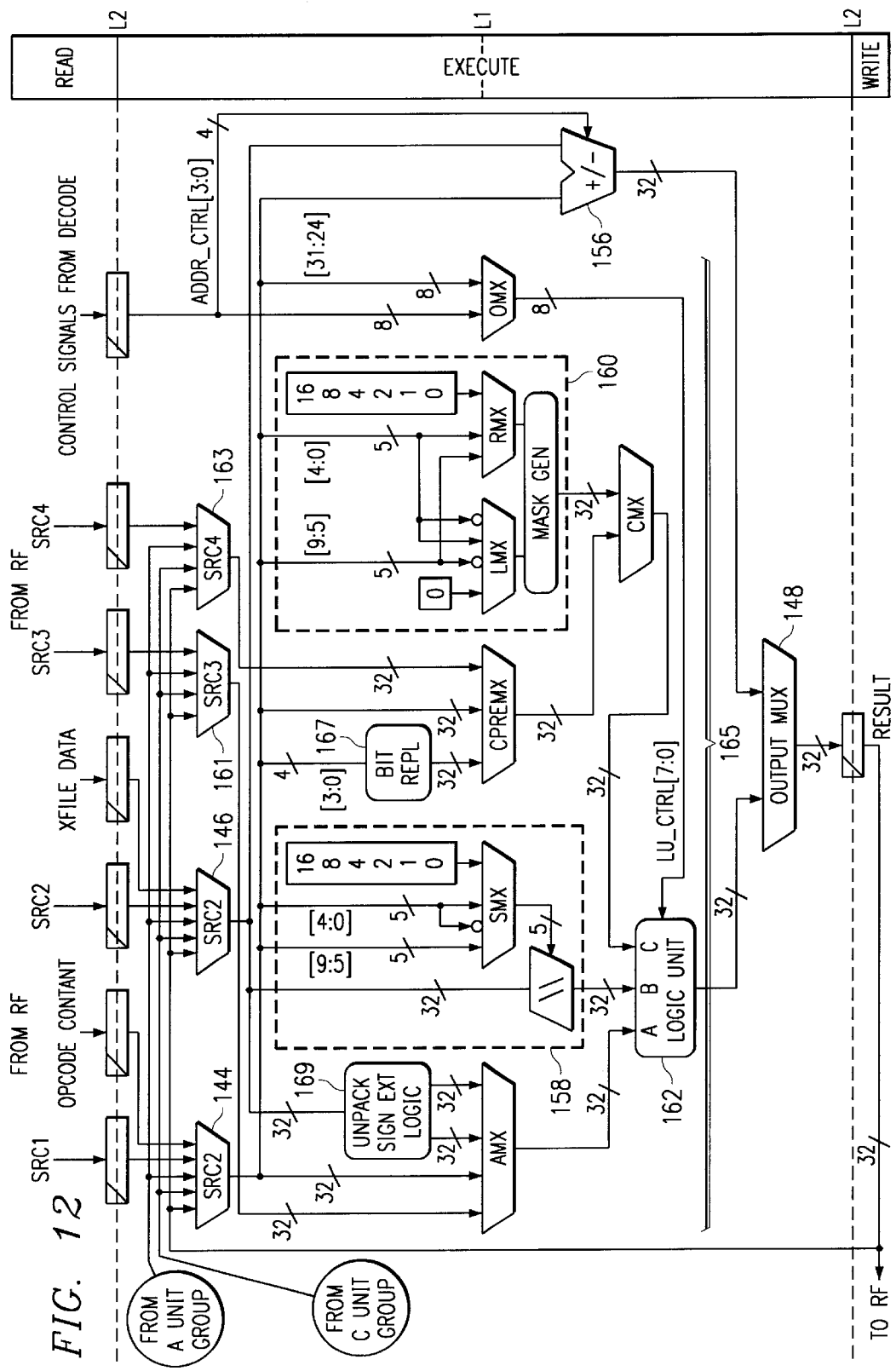
FIG. 12 is a block diagram of a D execution unit group of the DSP core of FIG. 2.

FIG. 12 is a top level block diagram of S unit group 82, which is optimized to handle shifting, rotating, and Boolean operations, although hardware is available for a limited set of add and subtract operations. S unit group 82 is unique in that most of the hardware can be directly controlled by the programmer. S unit group 82 has two more read ports than the A and C unit groups, thus permitting instructions to operate on up to four source registers, selected through input muxes 144, 146, 161, and 163. Similar to the A and C unit groups, the primary execution functionality is performed in the Execute cycle of the design. S unit group 82 has two major functional units: 32-bit S adder unit 156, and S rotate/Boolean unit 165. S rotate/Boolean unit 165 includes S rotator unit 158, S mask generator unit 160, S bit replicate unit 167, S unpack/sign extend unit 169, and S logical unit 162. The outputs from S rotator unit 158, S mask generator unit 160, S bit replicate unit 167, and S unpack/sign extend unit 169 are forwarded to S logical unit 162. The various functional units that make up S rotate/Boolean unit 165 can be utilized in combination to make S unit group 82 capable of handling very complex Boolean operations. Finally, result mux 148 selects an output from one of the two major functional units, S adder unit 156 and S rotate/Boolean unit 165, for forwarding to register file 76.

Figure 13:
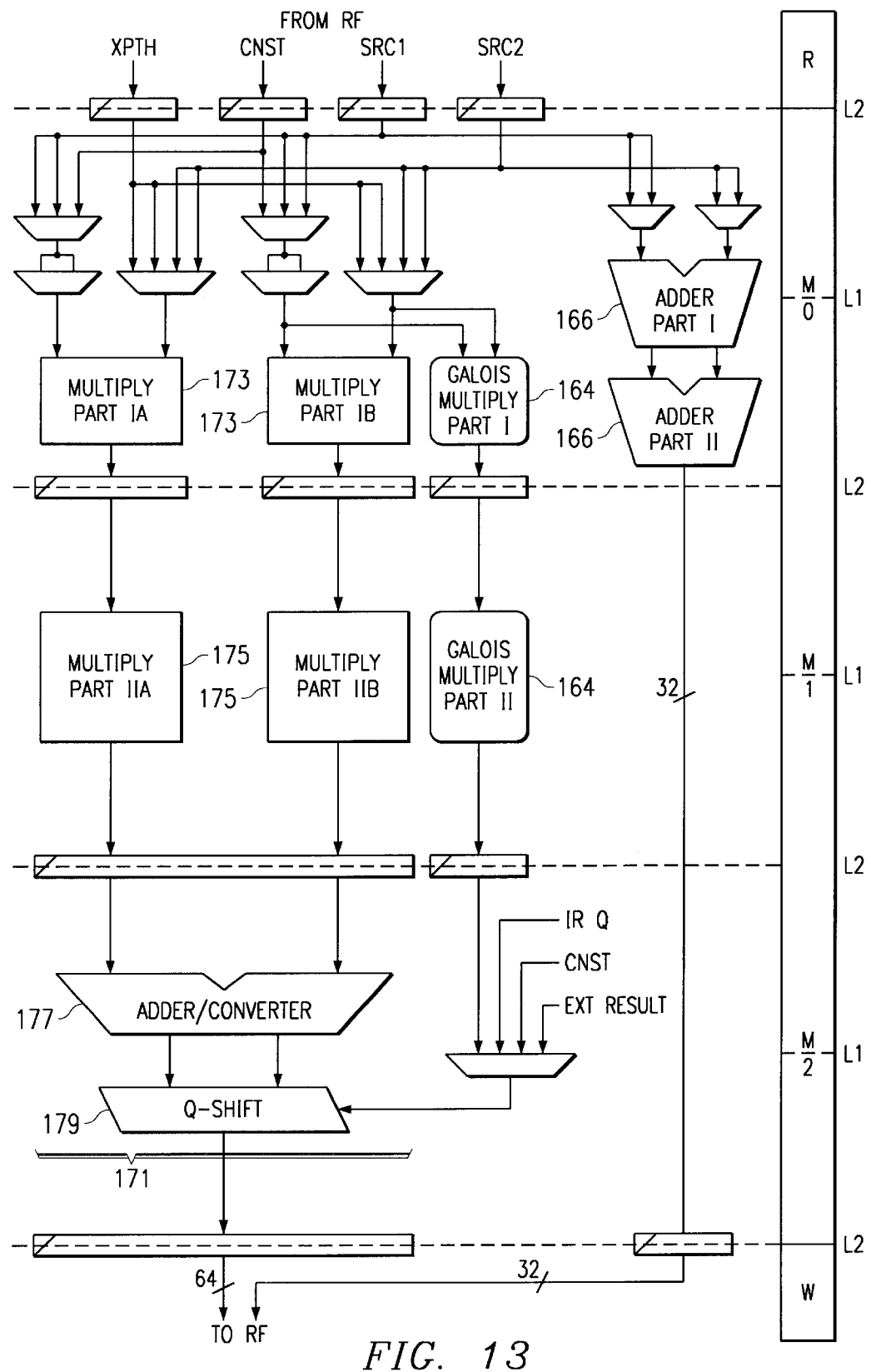
FIG. 13 is a block diagram of an M execution unit group of the DSP core of FIG. 2.

FIG. 13 is a top level block diagram of M unit group 84, which is optimized to handle multiplication, although hardware is available for a limited set of add and subtract operations. M unit group 84 has three major functional units: M Galois multiply unit 164, M adder unit 166 and M multiply unit 171. While M adder unit 166 can complete its operations within the Execute cycle, the other two units require two additional cycles to complete the multiply operations. In general, M multiply unit 171 can perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 173, which provide the inputs for Multiply Parts IIA & B 175, followed by the final stage which contains Adder/Converter 177 and Q-shift 179. M Galois multiply unit 164 performs Galois multiply in parallel with M multiply unit 171. For output from M unit group 84, the Galois multiply result is muxed with the M multiply result. M adder unit 166 is only lightly coupled to the other units in M unit group 84: it shares read port, but has a dedicated write port, making it possible for both a multiply and an add instruction to write results in the same cycle from M unit group 84.

Figure 14:
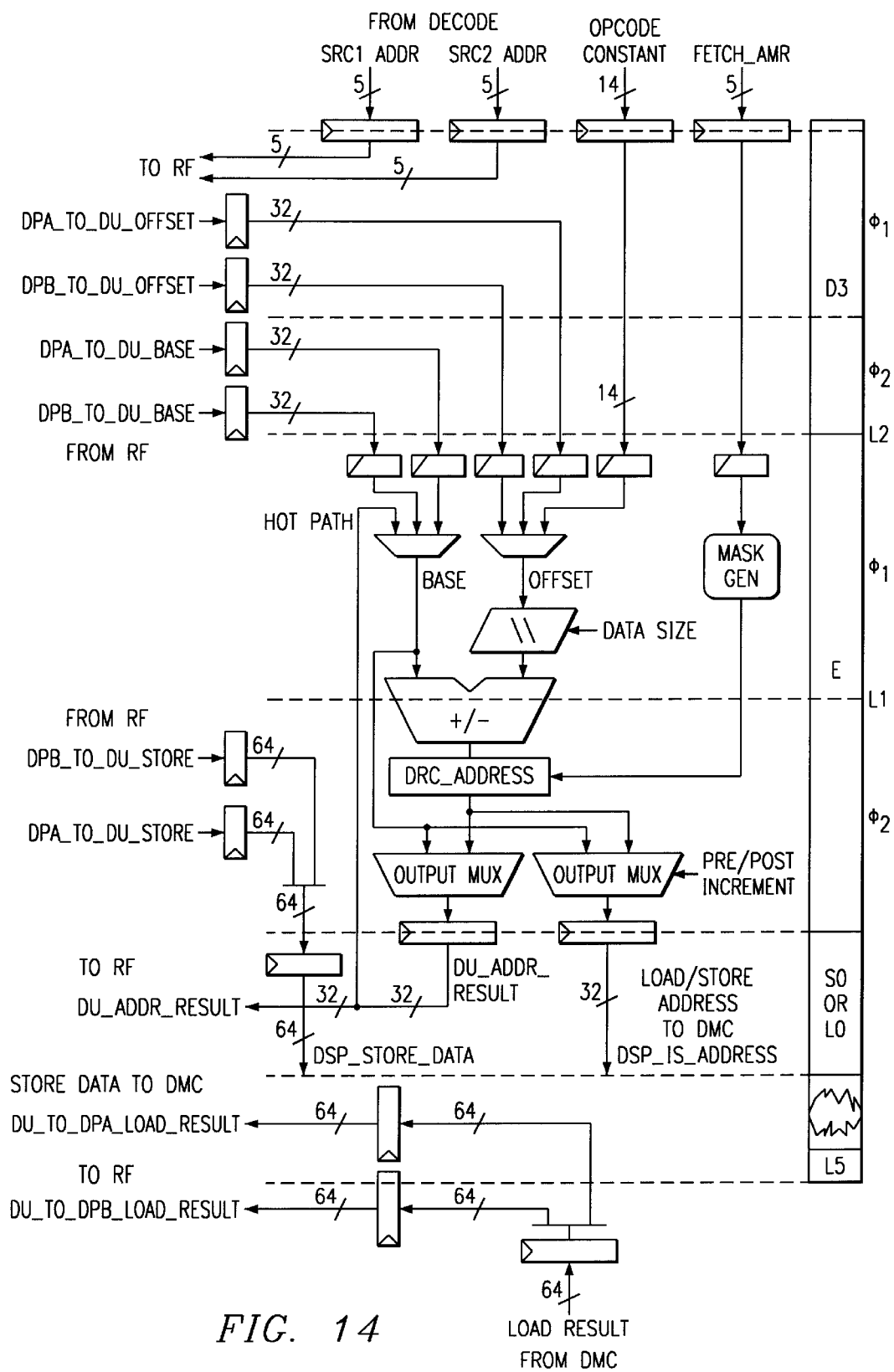
FIG. 14 is a block diagram of the D execution unit group of the DSP core of FIG. 2.

FIG. 14 is a top level block diagram of D group unit 72, which executes the load/store instructions and performs address calculations. D unit group 72 is shared between the two datapaths A 68 and B 70, and can reference the register files 76 of both datapaths. D unit group 72 also interfaces with Data Memory Controller 48. Load and Store instructions operate on data sizes from 8 bits to 64 bits. The different addressing modes supported by D unit group 72 are basic addressing, offset addressing, indexed addressing, auto-increment/auto-decrement, long immediate addressing, and circular addressing. In basic addressing mode, the content of a register is used as a memory address. In offset addressing mode, the memory address is determined by two values, a base value and an offset that is either added or subtracted from the base. The base value always comes from an address register, whereas the offset value may come from either an address register or a 5-bit unsigned constant contained in the instruction. Index addressing mode functions the same as offset addressing mode, except that the offset is interpreted as an index into a table of bytes, half-words, words or double-words, as indicated by the data size of the load or store operation. In auto-increment/decrement addressing mode, the base register is incremented/decremented after the execution of the load/store instruction. There are two sub-modes, pre-increment/decrement, where the new value in the base register is used as the load/store address, and post-increment/decrement where the original value in the register is used as the load/store address. In long-immediate addressing mode, a 14-bit unsigned constant is added to a base register to determine the memory address. In circular addressing mode, the base register along with a block size define a region in memory. To access a memory location in that region, an new index value is generated from the original index modulo the block size.

The address calculation for load/store operations is performed during the Execute stage of the pipeline, and the address write-back occurs in the phase1 of the next clock cycle. The newly calculated address value is also forwarded using a hot path, back to phase1 of E stage, which allows zero delay slot execution for back to back address calculations. The load/store address is calculated and passed onto DMC 48 after pipeline stage E. Results of a load are available from DMC 48 after 6 cycles in pipeline stage L5. The load operation has six delay slots. Data for store is supplied to DMC 48 in pipeline stage S0 along with the calculated address for the store location. FIG. 14 illustrates the different interconnections to register file 76 for fetching the operands from the two datapaths A 68 and B 70, getting the data for the store, and sending the results of address calculations and load operations to both datapaths. FIG. 14 approximately shows the relative pipeline stages during which the address results are computed and load/store data is received and sent, respectively.

FIG. 15 is a chart of the basic assembly format for DSP core 44 instructions, along with examples for each functional unit group. The '||' notation is used in optimized/scheduled assembly to indicate that an instruction is scheduled in the same execute packet with the preceding instruction(s). For example, in the following sequence, instructions (1) through (6) are scheduled in the same execute packet, and should execute simultaneously, although all six instructions will not complete at the same time.

|     | ADD | .A1 | A1,A2,A3    | ; (1)                                                                                                                |
|-----|-----|-----|-------------|----------------------------------------------------------------------------------------------------------------------|
| \|\| | SUB | .C1 | A4,A5,A6    | ; (2)                                                                                                                |
| \|\| | SHL | .S1 | A7,A8,A9    | ; (3)                                                                                                                |
| \|\| | MPY | .M1 | A10,A11,A12 | ; (4)                                                                                                                |
| \|\| | ADD | .A2 | B1,B2,B3    | ; (5)                                                                                                                |
| \|\| | MPY | .M2 | B4,B5,B6    | ; (6) Instructions (1), (2), (3), ; (4), (5), (6) may be scheduled in ; the same execute packet                      |
|     | SUB | .A2 | B3,B2,B1    | ; (7) Instruction (7) must be ; scheduled in the next execute ; packet because it reuses unit ; group A2              |

All instructions can be predicated (conditionally executed) on the value of a predication register. Assembly examples using the [predication reg] notation follow:

| [A0] ADD .A1 A1,A2,A3   | ; execute the ADD instruction if A0 ; is non-zero |
|-------------------------|---------------------------------------------------|
| [!A0]ADD .C2 B7,B8,B9   | ; execute the ADD instruction if A0 ; is zero     |

Because several instructions such as ADD or SUB are available in more than one unit group, the '.unit' notation is recommended when the programmer specifically wants to direct an instruction to a particular unit group. If the '.unit' notation is omitted, the compiler or assembler will automatically assign instructions to appropriate unit groups. Load, store and address instructions are only available in D-unit group 72, therefore the .D specification is redundant and optional. For the same reason, the .P specification is redundant for branch instructions in P-unit group 74.

The 'datapath' notation is also redundant and optional because the destination register implicitly specifies the datapath (note that for store instructions, the source register specifies the datapath). The 'crosspath' notation is used to indicate that one of the source operands (generally, op1 for the shift and bit-field instructions, op2 for all others; unary instructions may also use the crosspath on their operand) comes from the other datapath's register file via the crosspath.

Generally, one important aspect of designing a microprocessor architecture is implementing the proper mix of functions that can be performed in hardware and those that are left to be performed in software. Functions implemented in hardware can be performed more quickly, generally in one or a few cycles, but take up precious real estate on the microprocessor integrated circuit, and increase circuit complexity. Functions implemented in software, on the other hand, generally do not require any specially dedicated hardware to implement, but their execution time is much slower because they are generally performed over numerous instruction cycles. Therefore it is generally good design practice to implement in hardware functions that will be performed frequently by the microprocessor, especially those that are very difficult to execute in a reasonable time in software. The proper tradeoff between implementing functions in hardware and requiring others to be done in software allows the microprocessor to execute algorithms quickly and efficiently, while remaining cost effective in its design and manufacture. One method for determining what functions to implement in hardware is to analyze the applications for which the microprocessor is being designed, and ascertain the algorithms needed for those applications. Any lower level functions required by the algorithms that are highly repetitive and that are relatively slow when implemented in software are good candidates for implementation in hardware.

One example of the hardware or software implementation design tradeoff can be seen in the development of digital signal processors versus general purpose microprocessors. Multiplication generally takes a significant amount of hardware, and is slow when executed in software. In early general purpose microprocessors, multiplication was not required by enough applications to warrant putting a multiplier on the integrated circuit. In contrast, digital signal processor applications generally used algorithms (e.g., FFTs) requiring frequent multiplication calculations, and thus demanded fast multiplication cycle time. Therefore multiplication hardware was generally implemented in hardware in the early digital signal processors, but not in general purpose microprocessors until it became more cost effective.

Figure 16:
FIG. 16 is a diagram illustrating a diagonal mirror image transformation of an 8-bit×8-bit block of data.

Some microprocessor applications, such as video applications, use algorithms that require the manipulation of an array or block of data. One function that has been implemented in software for such applications is the mirror imaging of a block of data along a diagonal of the block wherein a=b for bit(a,b) in the array. As shown in FIG. 16, 8-bit by 8-bit block of data 168 is operated on by a mirror image transformation along diagonal 170, to arrive at transformed block 172. Effectively, each row in original block 168 has effectively become a column in transformed block 172. For example, bits 0 to 7 in first row 174 of block 168 are transposed in position to become bits 0 to 7 in first column 176 of transformed block 172. Note that bits which are along diagonal 170 do not change their relative locations during the transformation. While this transformation is simple to perform with pencil and paper, performing it in software is generally a cumbersome and slow process due to the inherent operation of microprocessors. For example, assume that the data in block 168 is pixel map data and is stored in data words of 32 bits or double words of 64 bits. To read in 8-bit by 8-bit block 168 requires 8 byte reads, one for each horizontal 8-bit row, because these are stored in different data words. The mirror image transformation then requires many rotate/mask/merge operations (probably around 32 to 40 as an estimate). The transformed data can then be stored by 8 read/modify/write operations to write the 8 bytes into 8 data words in memory.

Figures 17, 18A, 18B:
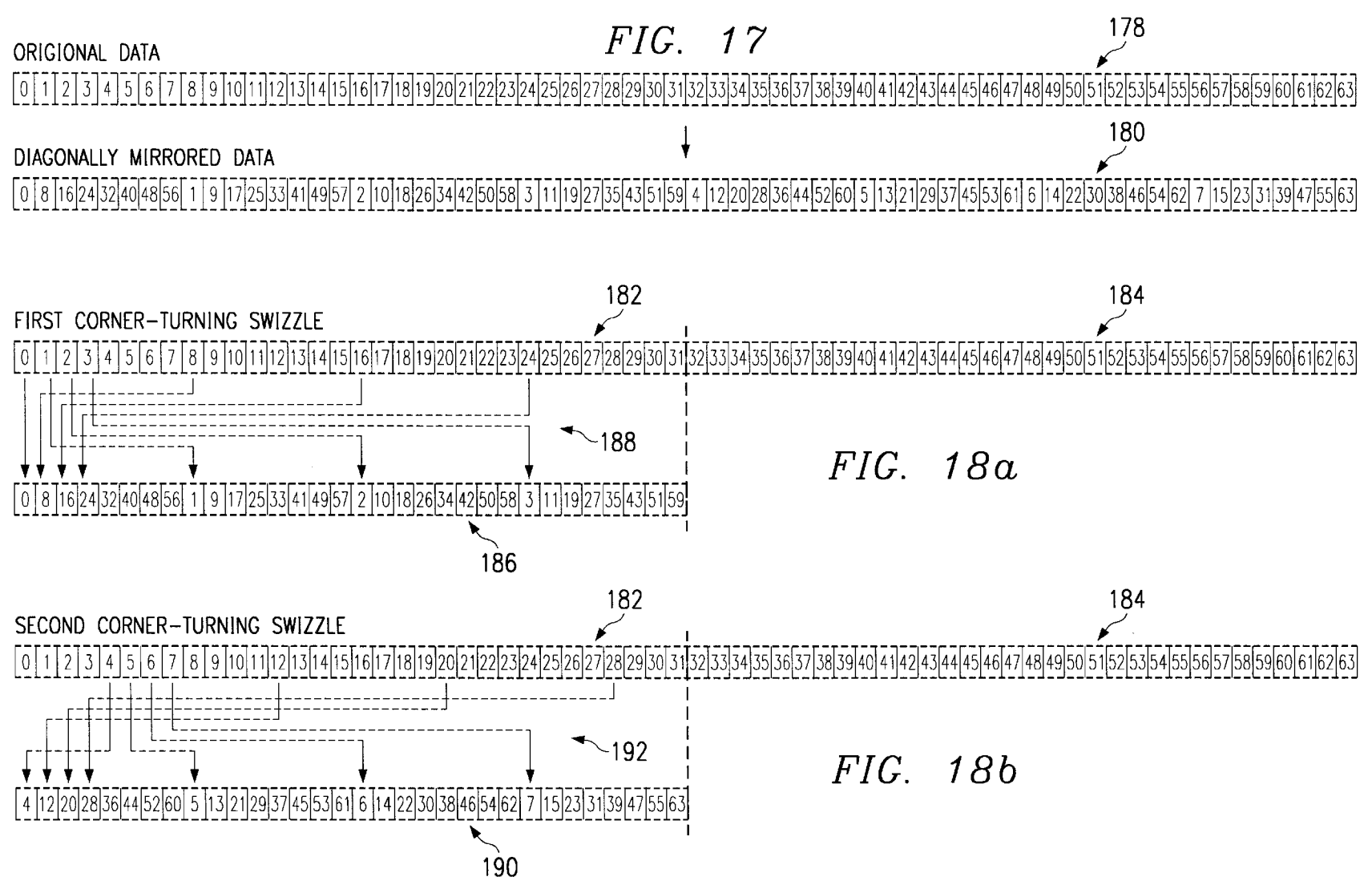

According to the present invention, a corner-turning swizzle hardware assist is provided for the data transformation, significantly speeding up the overall operation without adding excess complexity to the hardware design. While the number of load and store operations generally do not change, the 32 to 40 rotate/mask/merge operations are reduced to only 2 operations that can be performed in two cycles. The swizzle operations are easier to envision when the data is laid out in a single row of 64 bits, as shown in FIG. 17. Row 178 depicts the original data, and is basically just the 8 bytes from block 168 displayed linearly instead of in an array. Similarly, row 180 depicts the diagonally mirrored data, and represents the 8 bytes from block 172 displayed linearly. When viewed in this manner, it can be seen that both the original data block and the transformed block can each be represented by two 32-bit words of data. Referring now to FIG. 18a, in the first cycle, the corner-turning swizzle assist hardware takes in two register operands 182 and 184 of 32-bits each, thus considering the entire 64 bits of input data 178. This first cycle then produces the 32 most significant bits of transformed data 186, which is then stored in 32-bit data register. The 32-bit output 186 is produced by performing the upper half of 8-way bit deal of the 64 bits of input data 178, as partially illustrated by bit deals 188. As shown in FIG. 18b, the second cycle also considers all 64 bits of input data 178 from the two source registers as in the first cycle and produces the 32 least significant bits of transformed data 190 for storage in another data register. The lower half of the 8-way bit deal is performed produce 32-bit output 186, as partially illustrated by bit deals 192. Transformed data 186 and 190 is then restored to memory in eight 8 byte stores. Thus the corner-turning swizzle hardware assist enables the diagonal mirror imaging of an 8-bit by 8-bit block of data much more quickly than a pure software transformation.

It should be noted that, once the concept taught by the present invention is understood, the actual hardware implementation needed to perform bit deals 188 and 192 is trivial and easily accomplished by a person of ordinary skill in the art. FIG. 19 illustrates an example of this hardware. In this example the corner-turning swizzle unit is a part of A-unit group 78 and is connected in the same fashion as pack/ replicate unit 136 and shuffle unit 138. The corner-turning swizzle unit receives first and second operands like other units illustrated in FIG. 10. First deal unit 187 performs the first corner-turning swizzle illustrated in FIG. 18a. Likewise, second deal unit 191 performs the second corner-turning swizzle illustrated in FIG. 18b. Note each of these units 187 and 191 involve nothing more than a set of conductors making the bit connections illustrated in respective FIGS. 18a and 18b. FIG. 19 illustrates connection from each input operand to first deal unit 187 and second deal unit 191. However, as illustrated in FIGS. 18a and 18b, only half of the bits of each operand need be connected to the first deal unit 187 and the second deal unit 191. First deal unit 187 requires only bits 0–3, 8–11, 16–19, 24–27 from first operand 182 and bits 32–35, 40–43, 48–51 and 56–59 from second operand 184. Likewise, second deal unit 191 requires only bits 4–7, 12–15, 20–23 and 28–31 from first operand 182 and bits 36–39, 44–47, 52–55 and 60–63 from second operand 184. Multiplexer 193 selects the output of one of the first deal unit 187 or the second deal unit 193 according to a control signal dependent upon the instruction. It is contemplated that the corner-turning swizzle will be implemented with an instruction coding a first register operand, a second register operand, a destination register and an indication of either the first corner-turning swizzle or the second corner-turning swizzle. The operands could both be from the corresponding register file 76 or one could be from the corresponding register file 76 and one from the other register file 76 via the cross path. The destination must be within the corresponding register file 76.

Tailoring the size of the block of data and the amount of output data generated per cycle to the data lengths normally processed by the microprocessor allow the implementation of the function in hardware without adding excess complexity to the integrated circuit. The size of the block could be made smaller or larger to best match it to a particular microprocessor architecture. Alternatively, the 8-bit by 8-bit block hardware assist unit can enable diagonal mirror imaging of blocks larger than 8 bits by 8 bits, such as the one shown in FIG. 20. Due generally to standard microprocessor hardware and software design practice, many selected block unit sizes will be an integral number of 8-bit by 8-bit blocks in both the horizontal and vertical dimensions. In general, for an M×M bit data block divided into Y N×N bit data blocks, M=N×Z, Z is an integer greater than one, and Y=Z$^2$. For example, if M=32 and N=8, then Z=4 and Y=16, so there are 16 8×8 bit data blocks in a 32×32 bit data block.

As illustrated in FIG. 20, to perform the transformation, first the larger block, in this case 16-bit by 16-bit block 194 is divided into 8-bit by 8-bit blocks B1 198, B2 200, B3 202 and B4 204. All 8-bit by 8-bit blocks containing major diagonal 214 wherein a=b for bit(a,b), in this case blocks B1 198 and B4 204, are mirrored in place to produce transformed blocks B1' 206 and B4' 212, respectively. For other blocks that are not located on the major diagonal, the individual blocks are internally mirrored and then swapped with their mirror image blocks. In this case blocks B2 200 and B3 202 are mirrored and then their outputs are swapped so that block B2' 210 is in the same relative location as original block B3 202 and block B3' 208 is in the same relative location as original block B2 200. This block swap may be accomplished by using a second image buffer in memory or alternatively by buffering two mirror image blocks of output data and switching the blocks on writing back to memory. The output of the operation is transformed block 196. Another example is shown in FIG. 21, wherein 32-bit by 32-bit block of data 216 is mirrored along major diagonal 220 to produce transformed block 218, using the approach discussed with respect to FIG. 20. Thus the hardware assist unit generally enhances all diagonal mirroring functions regardless of the data size.

Several example systems which can benefit from aspects of the present invention are described in U.S. Pat. No. 5,072,418, in particular with reference to FIGS. 2–18 of U.S. Pat. No. 5,072,418. A microprocessor incorporating an embodiment of the present invention to improve performance or reduce cost may be used to further improve the systems described in U.S. Pat. No. 5,072,418. Such systems include, but are not limited to, video imaging systems, industrial process control, automotive vehicle safety systems, motor controls, robotic control systems, satellite telecommunications systems, echo canceling systems, modems, speech recognition systems, vocoder-modem systems with encryption, and such.

As used herein, the terms "applied," "connected," "connecting," and "connection" mean electrically connected, including where additional elements may be in the electrical connection path. As used herein, the term "microprocessor" is intended to encompass "microcomputers," which generally are microprocessors with on-chip Read Only Memory (ROM). As these terms are often used interchangeably in the art, it is understood that the use of one or the other of these terms herein should not be considered as restrictive as to the features of this invention.

Various specific circuit elements well known in the art may be used to implement the detailed circuitry of the preferred embodiments, and all such alternatives are comprehended by the invention. For example, data storage elements such as registers may be implemented using any suitable storage device, such as a latches, flip-flops, FIFOs, memory addresses, or RAM cells. Depending on the particular configuration of a design, a bus may consist of one or more individual lines or buses. Muxes may be implemented using any suitable circuit element, such as logic circuits, tri-state circuits, or transmission gate circuits. Some circuits may be implemented as structurally separate from other circuits, or may be implemented in combination with other circuits.

An alternative embodiment of the novel aspects of the present invention may include other circuitries which are combined with the circuitries disclosed herein in order to reduce the total gate count of the combined functions. Because those skilled in the art are aware of techniques for gate minimization, the details of such an embodiment are not described herein.

Although the invention has been described with reference to a specific processor architecture, it is recognized that one of ordinary skill in the art can readily adapt the described embodiments to operate on other processors. Depending on the specific implementation, positive logic, negative logic, or a combination of both may be used. Also, it should be understood that various embodiments of the invention can alternatively employ hardware, software, microcoded firmware, or combinations of each, yet still fall within the scope of the claims. Process diagrams for hardware are also representative of flow diagrams for microcoded and software-based embodiments. Thus the invention is practical across a spectrum of software, firmware and hardware.

Finally, while this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data processing apparatus for mirror image transformation of an N×N bit data block, where N is an integer, the data processing apparatus comprising:
   a data register file including
      a plurality of data registers storing data of bit length I, where 2I=N×N and I is an integer,
      a first read port outputting a first input operand from an instruction specified one of said plurality of data registers,
      a second read port outputting a second input operand from an instruction specified one of said plurality of data registers, and
      a write port for storing received write data into an instruction specified one of said plurality of data registers;
   a first hardware bit transformation unit receiving data from said first and second read ports and forming an upper half of said bit length I of an N-way bit deal of said first and second input operands;
   a second hardware bit transformation unit receiving data from said first and second read ports and forming a lower half of said bit length I of said N-way bit deal, whereby said upper and lower halves of said N-way bit deal represent a diagonally mirrored image of said N×N bit data block;
   a multiplexer connected to said first and second hardware bit transformation units coupling an instruction specified one of said upper half or said lower half of the N-way bit deal of the first and second operands to said write port.

2. The apparatus of claim 1 wherein N equals 8 and I equals 32.

3. The apparatus of claim 2 wherein:
   said first input operand includes bits 0 to 31 of the N×N bit data block;
   said second input operand includes bits 32 to 63 of the N×N bit block data;
   said upper half of an N-way bit deal of said first and second input operands consists of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block.

4. The apparatus of claim 2 wherein:
   said first input operand includes bits 0 to 31 of the N×N bit data block;
   said second input operand includes bits 32 to 63 of the N×N bit block data; and
   said lower half of an N-way bit deal of said first and second input operands consists of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

5. The apparatus of claim 2 wherein:
   said first input operand includes bits 0 to 31 of the N×N bit data block;
   said second input operand includes bits 32 to 63 of the N×N bit block data;
   said upper half of an N-way bit deal of said first and second input operands consists of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block; and said lower half of an N-way bit deal of said first and second input operands consists of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

6. A method of generating a diagonally mirrored image of an N×N bit data block, where N is an integer, said method comprising:

retrieving a first N/2 N-bit rows of said data block from a memory and packing said first N/2 rows into a first input operand loaded into a first input register, said first input register having a bit length I, where 2I=N×N and I is an integer;

retrieving a second N/2 N-bit rows of said data block from said memory and packing said second N/2 rows into a second input operand loaded into a second input register, said second input register having said bit length I;

performing a first hardware bit transformation forming an upper half of said bit length I of an N-way bit deal of said first and second input operands;

storing said upper half of said N-way bit deal of said first and second input operands to a first destination register, said first destination register having said bit length I;

performing a second hardware bit transformation forming a lower half of said bit length I of an N-way bit deal of said first and second input operands;

storing said lower half of said N-way bit deal of said first and second input operands to a second destination register, said second destination register having said bit length I; and unpacking N N-bit data segments from said first and second destination registers and storing said data segments to said memory, whereby said N N-bit data segments represent said diagonally mirrored image of said N×N bit data block.

7. The method according to claim 6 wherein said retrieving of each of said first and second N/2 N-bit rows comprise a byte load operation.

8. The method according to claim 6 wherein said storing of each of said N N-bit data segments comprises a byte store operation.

9. The method according to claim 6 wherein N equals 8 and I equals 32.

10. The method according to claim 9 wherein:

said first input operand includes bits 0 to 31 of the N×N bit data block;

said second input operand includes bits 32 to 63 of the N×N bit block data; and said step of performing said first hardware bit transformation consists of forming said upper half of said N-way bit deal consisting of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block.

11. The method according to claim 9 wherein:

said first input operand includes bits 0 to 31 of the N×N bit data block;

said second input operand includes bits 32 to 63 of the N×N bit block data; and said step of performing said second hardware bit transformation consists of forming said first said lower half of an N-way bit deal consisting of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

12. The method according to claim 6 wherein:

N equals 8;

I equals 32;

said first input operand includes bits 0 to 31 of the N×N bit data block;

said second input operand includes bits 32 to 63 of the N×N bit block data;

said step of performing said first hardware bit transformation consists of forming said upper half of said bit length I of said N-way bit deal consisting of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block; and said step of performing said second hardware bit transformation consists of forming said first said lower half of said bit length I of an N-way bit deal consisting of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

13. A method of generating a diagonally mirrored image of an M×M bit data block, said method comprising:

dividing said M×M bit data block into Y N×N bit data blocks, wherein M=N×Z, Z is an integer greater than one, and Y=Z²;

generating a minor diagonally mirrored image of each of said N×N bit data blocks, comprising retrieving a first N/2 N-bit rows of said N×N data block from a memory and packing said first N/2 rows into a first input operand loaded into a first input register, said first input register having a bit length I, where 2I=N×N and I is an integer, retrieving a second N/2 N-bit rows of said N×N data block from said memory and packing said second N/2 rows into a second input operand loaded into a second input register, said second input register having said bit length I, performing a first hardware bit transformation forming an upper half of said bit length I of an N-way bit deal of said first and second input operands;

storing said upper half of said N-way bit deal of said first and second input operands to a first destination register, said first destination register having said bit length I;

performing a second hardware bit transformation forming a lower half of said bit length I of an N-way bit deal of said first and second input operands;

storing said lower half of said N-way bit deal of said first and second input operands to a second destination register, said second destination register having said bit length I; and unpacking N N-bit data segments from said first and second destination registers, and storing said minor diagonally mirrored image to said memory, wherein N×N data block A and N×N data block B are swapped in memory if block A and block B are mirror image blocks of each other about a major diagonal of said M×M bit data block where a=b for bit (a,b).

14. The method according to claim 13, wherein N equals 8, I equals 32 and M equals 16.

15. The method according to claim 13, wherein N equals 8, I equals 32 and M equals 32.

16. The method according to claim 13 wherein:

N equals 8;

I equals 32;

said first input operand includes bits 0 to 31 of the N×N bit data block;

said second input operand includes bits 32 to 63 of the N×N bit block data; and said step of performing said first hardware bit transformation consists of forming said upper half of said bit length I of said N-way bit deal consisting of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block.

17. The method according to claim 13 wherein:

N equals 8;

I equals 32;

said first input operand includes bits 0 to 31 of the N×N bit data block;

said second input operand includes bits 32 to 63 of the N×N bit block data; and said step of performing said second hardware bit transformation consists of forming said first said lower half of said bit length I of an N-way bit deal consisting of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

18. The method according to claim 13, wherein:

N equals 8;

I equals 32;

said first input operand includes bits 0 to 31 of the N×N bit data block;

said second input operand includes bits 32 to 63 of the N×N bit block data;

said step of performing said first hardware bit transformation consists of forming said upper half of said bit length I of said N-way bit deal consisting of bits 0, 8, 16, 24, 32, 40, 48, 56, 1, 9, 17, 25, 33, 41, 49, 57, 2, 10, 18, 26, 34, 42, 50, 58, 3, 11, 19, 27, 35, 43, 51 and 59 of the N×N bit data block; and said step of performing said second hardware bit transformation consists of forming said first said lower half of said bit length I of an N-way bit deal consisting of bits 4, 12, 20, 28, 36, 44, 52, 60, 5, 13, 21, 29, 37, 45, 53, 61, 6, 14, 22, 30, 38, 46, 54, 62, 7, 15, 23, 31, 39, 47, 55 and 63 of the N×N bit data block.

* * * * *